Figure 1:
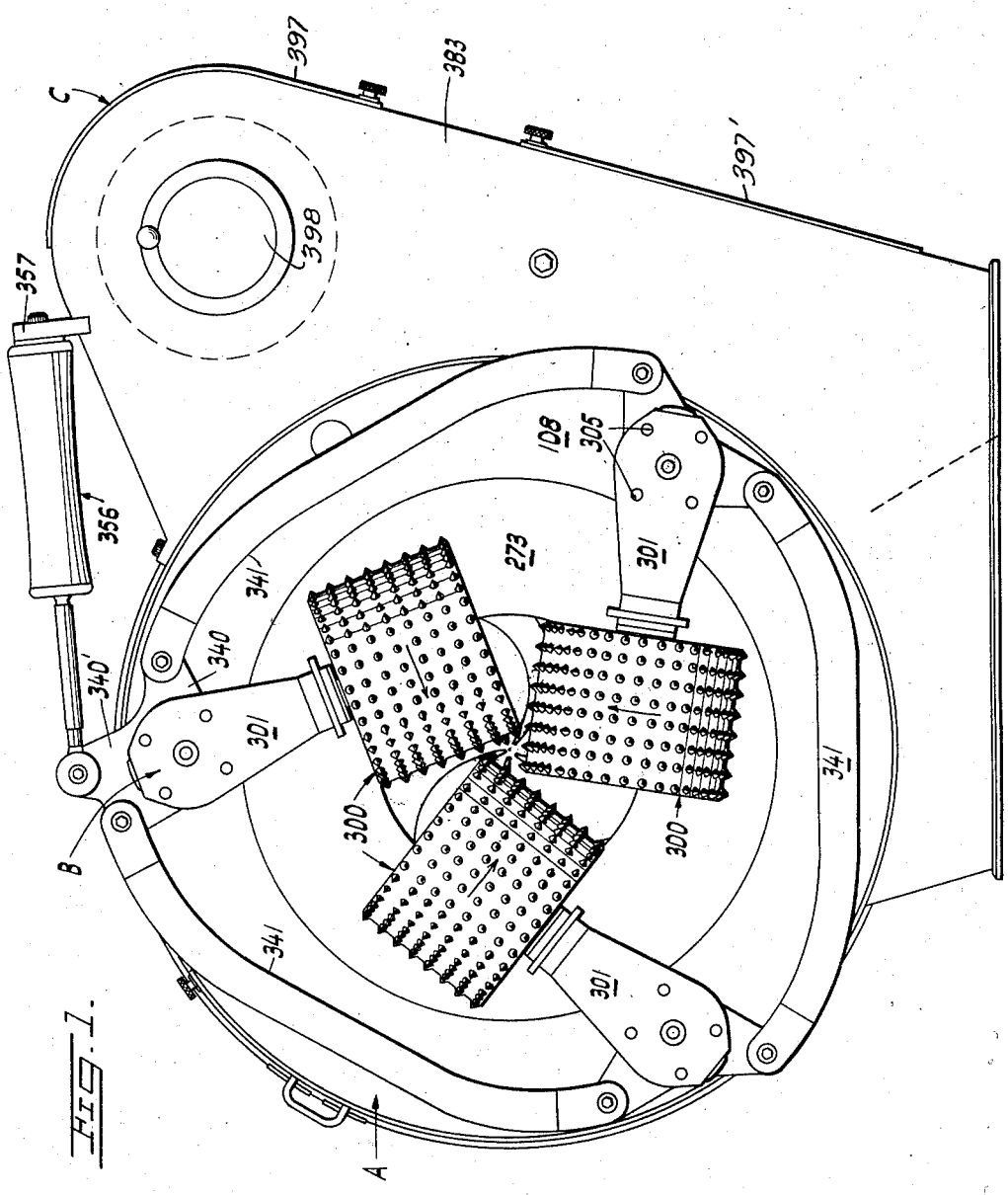

Oct. 28, 1958  P. G. BRUNDELL ET AL  2,857,945
MACHINE FOR REMOVING BARK FROM LOGS
Filed March 22, 1956  14 Sheets-Sheet 1

INVENTORS
P. G. Brundell
K. E. A. Jonsson
BY
Glascock Downing Seebold
ATTYS.

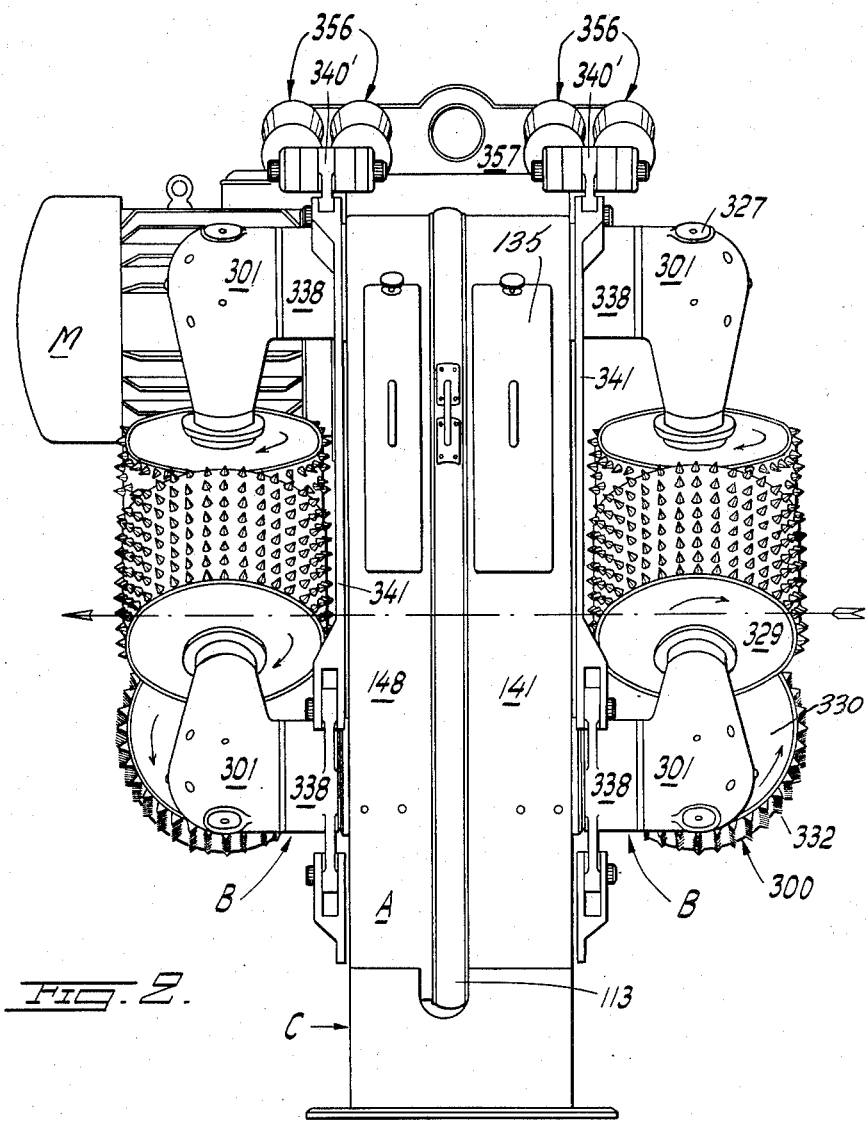

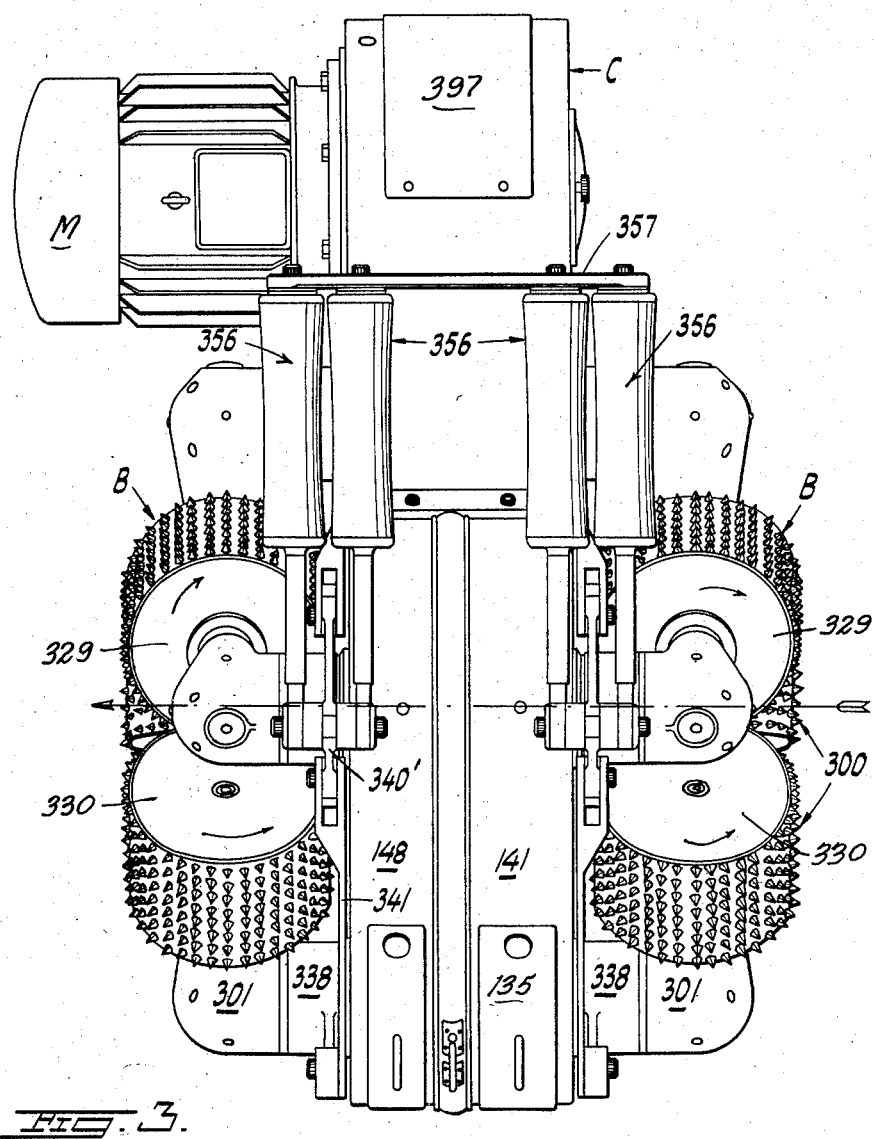

Oct. 28, 1958  P. G. BRUNDELL ET AL  2,857,945
MACHINE FOR REMOVING BARK FROM LOGS
Filed March 22, 1956  14 Sheets-Sheet 4
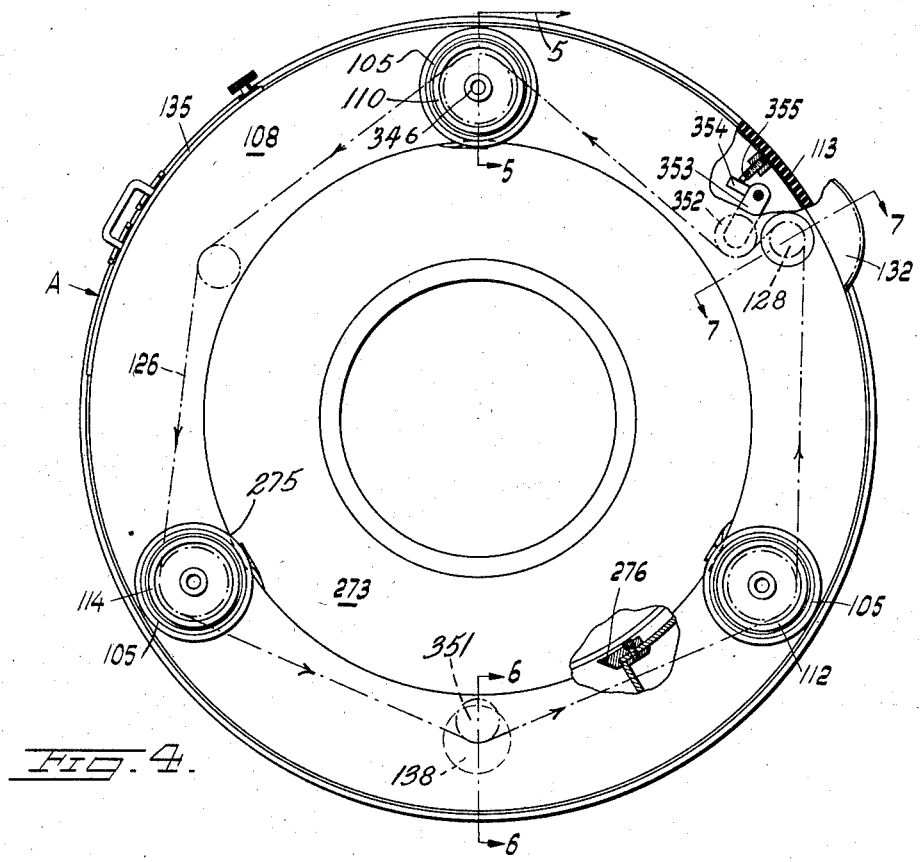
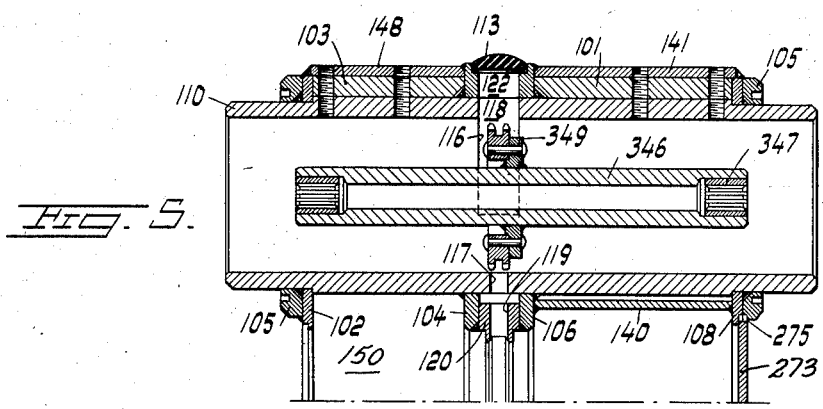
INVENTORS
P. G. Brundell
BY K. E. A. Jonsson
ATTYS.

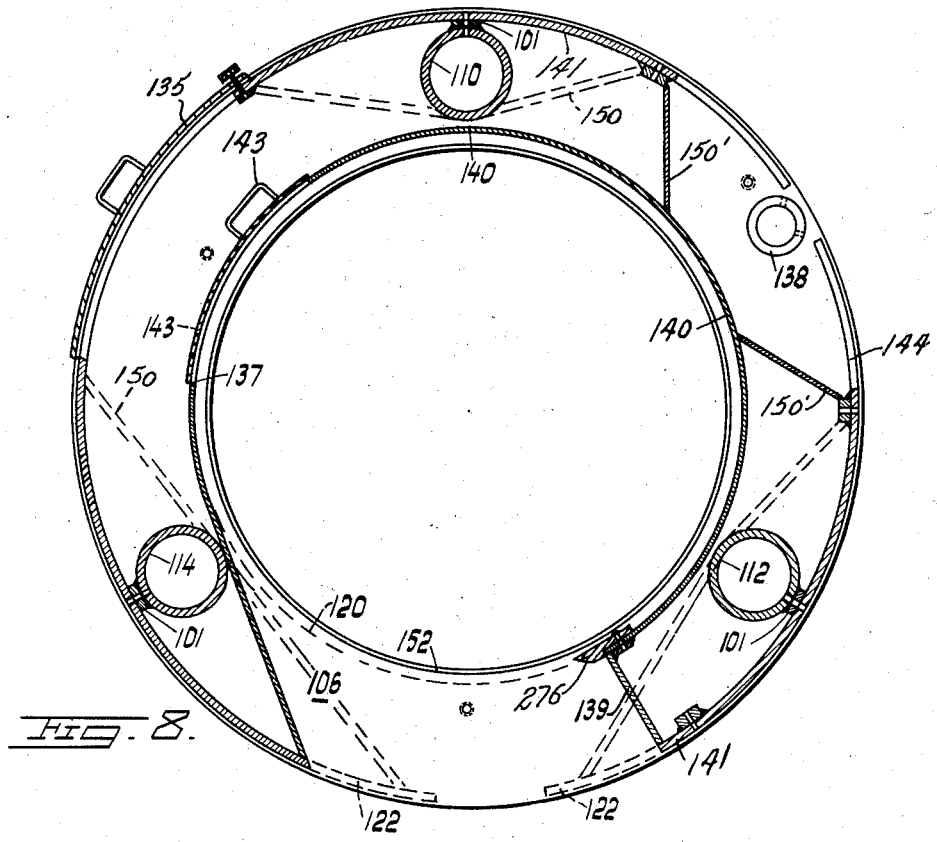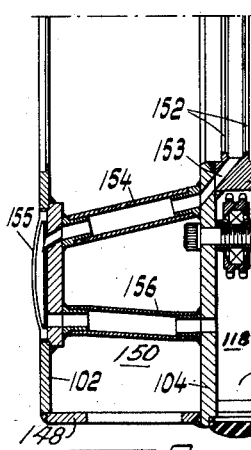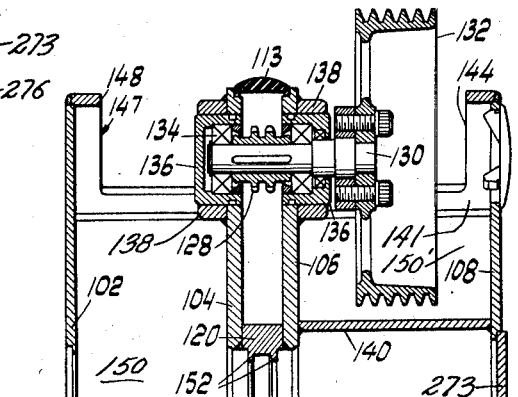

Oct. 28, 1958  P. G. BRUNDELL ET AL  2,857,945
MACHINE FOR REMOVING BARK FROM LOGS
Filed March 22, 1956  14 Sheets-Sheet 6

INVENTORS
P. G. Brundell
BY K-E. A. Jonsson
ATTYS.

Oct. 28, 1958     P. G. BRUNDELL ET AL     2,857,945
MACHINE FOR REMOVING BARK FROM LOGS
Filed March 22, 1956     14 Sheets-Sheet 7

INVENTORS
P. G. Brundell
K. E. A. Jonsson
BY
Glascock Downing Seebold
ATTYS.

Oct. 28, 1958 P. G. BRUNDELL ET AL 2,857,945
MACHINE FOR REMOVING BARK FROM LOGS
Filed March 22, 1956 14 Sheets-Sheet 8

INVENTORS
P. G. Brundell
BY K-E. A. Jonsson
Glascock Downing Seebold
ATTYS.

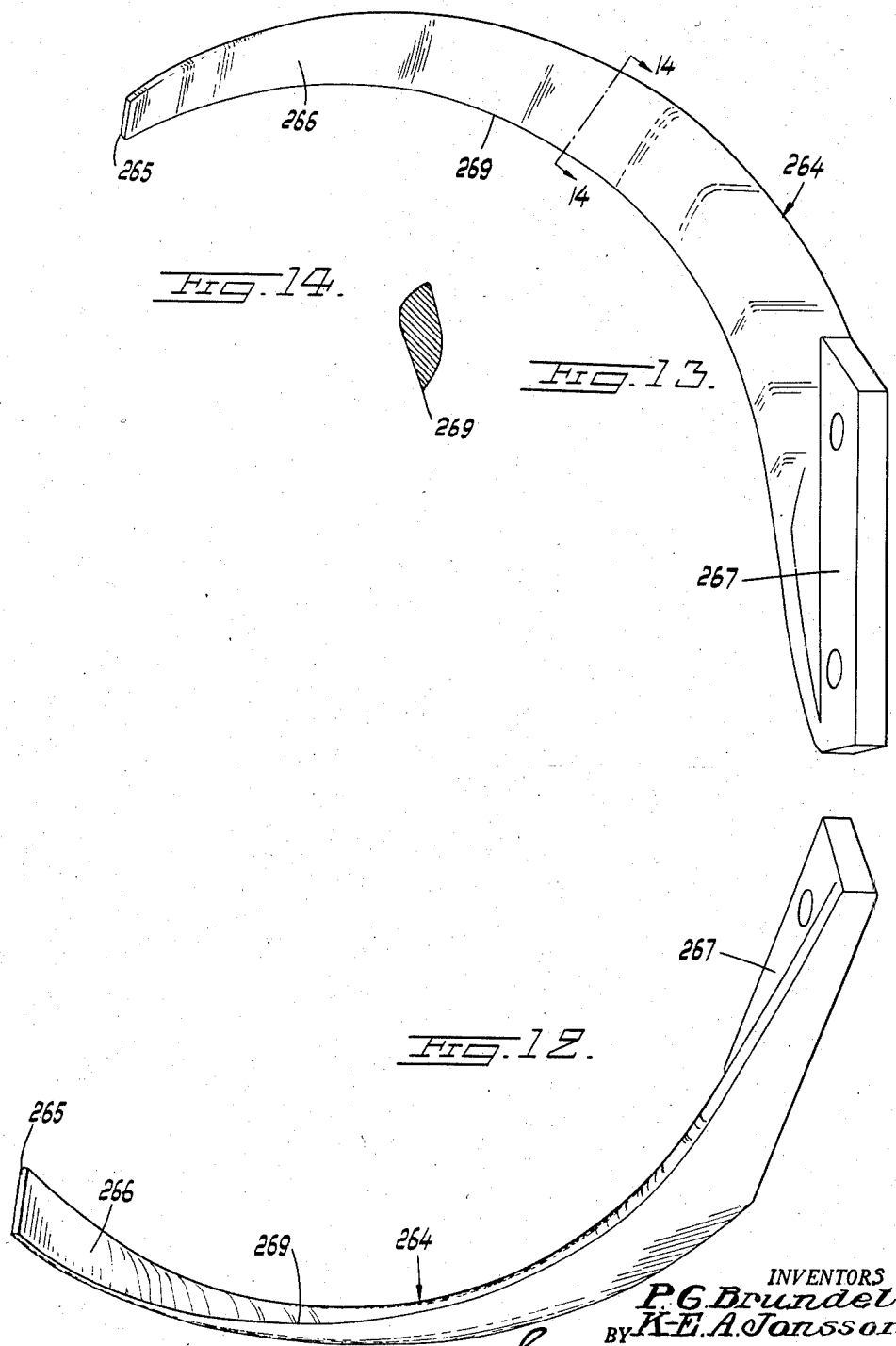

Oct. 28, 1958 P. G. BRUNDELL ET AL 2,857,945
MACHINE FOR REMOVING BARK FROM LOGS
Filed March 22, 1956 14 Sheets-Sheet 10

INVENTORS
P.G.Brundell
BY K.E.A.Jonsson
ATTYS.

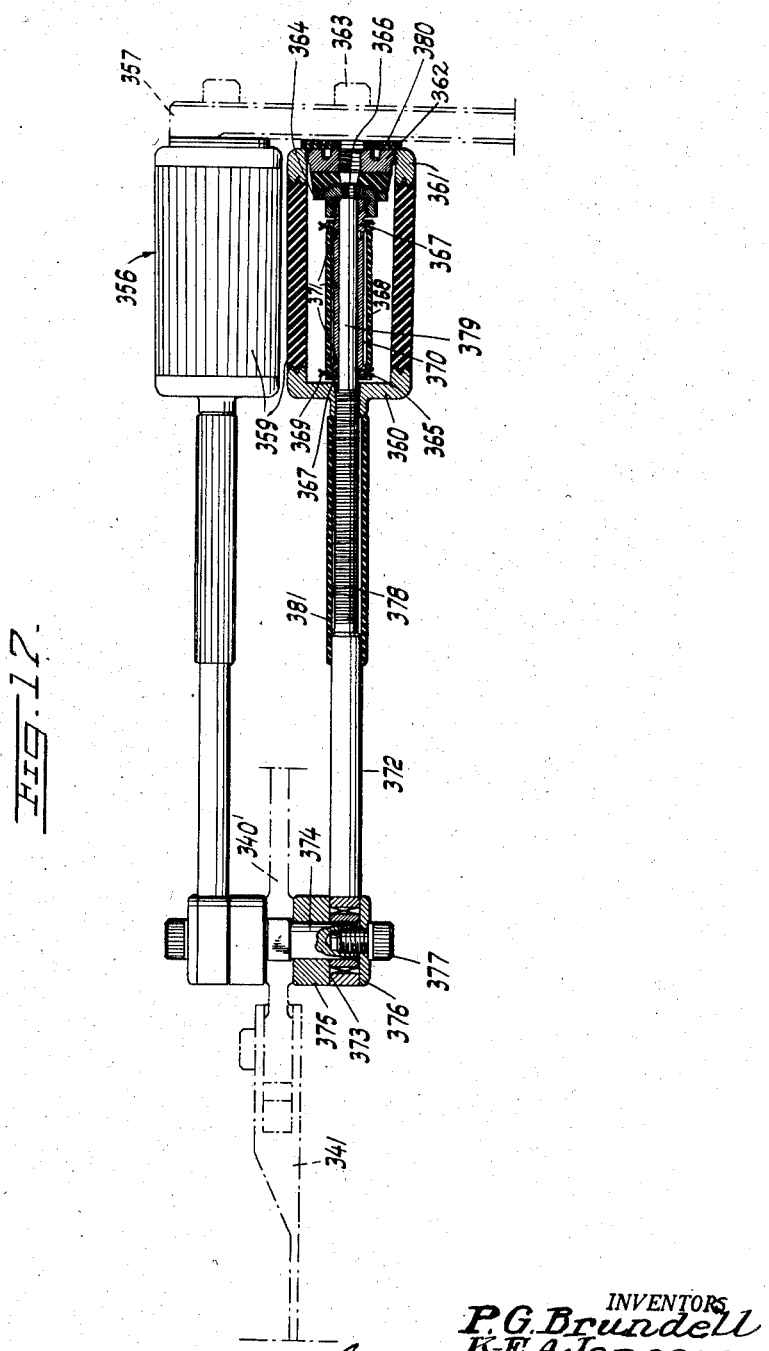

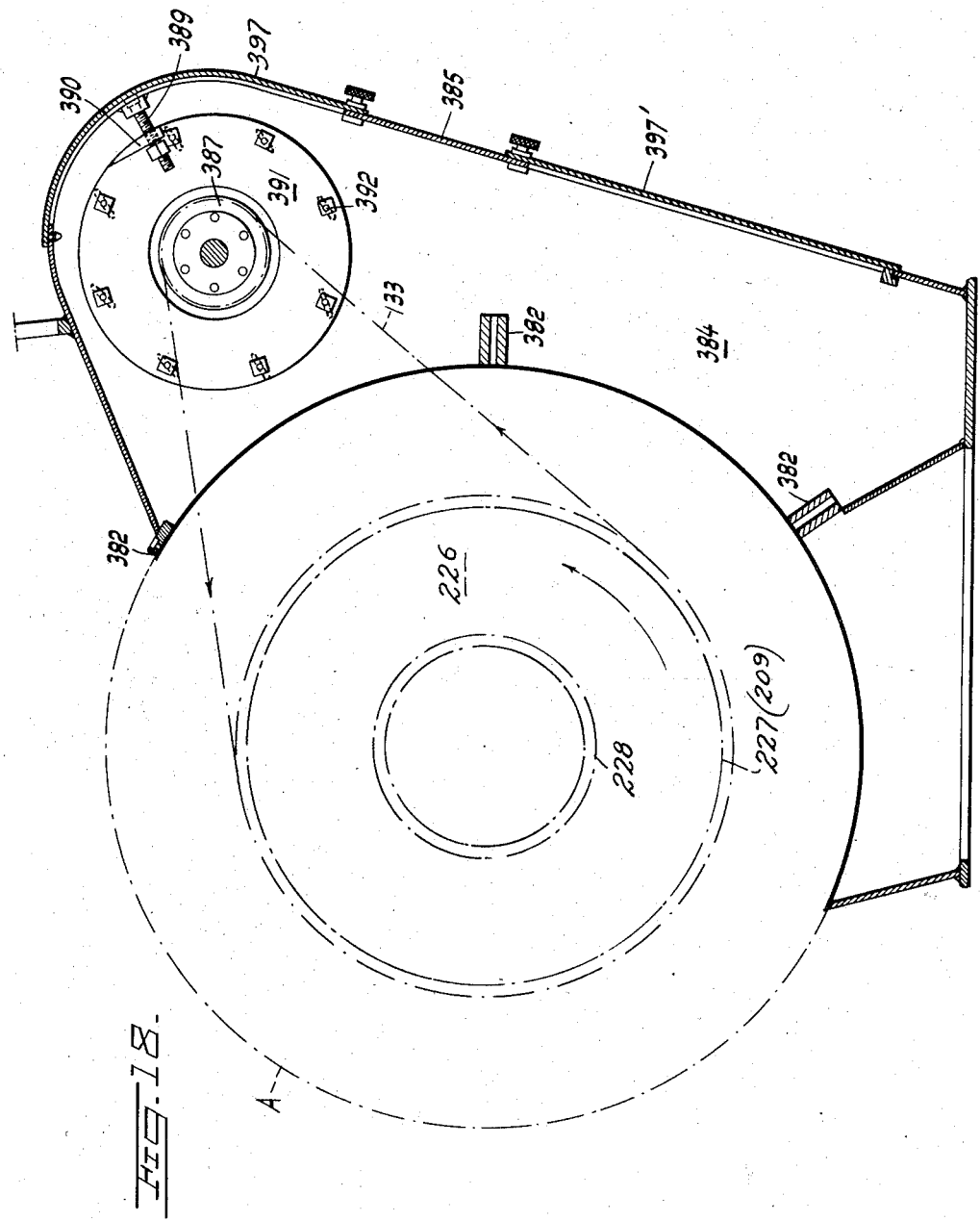

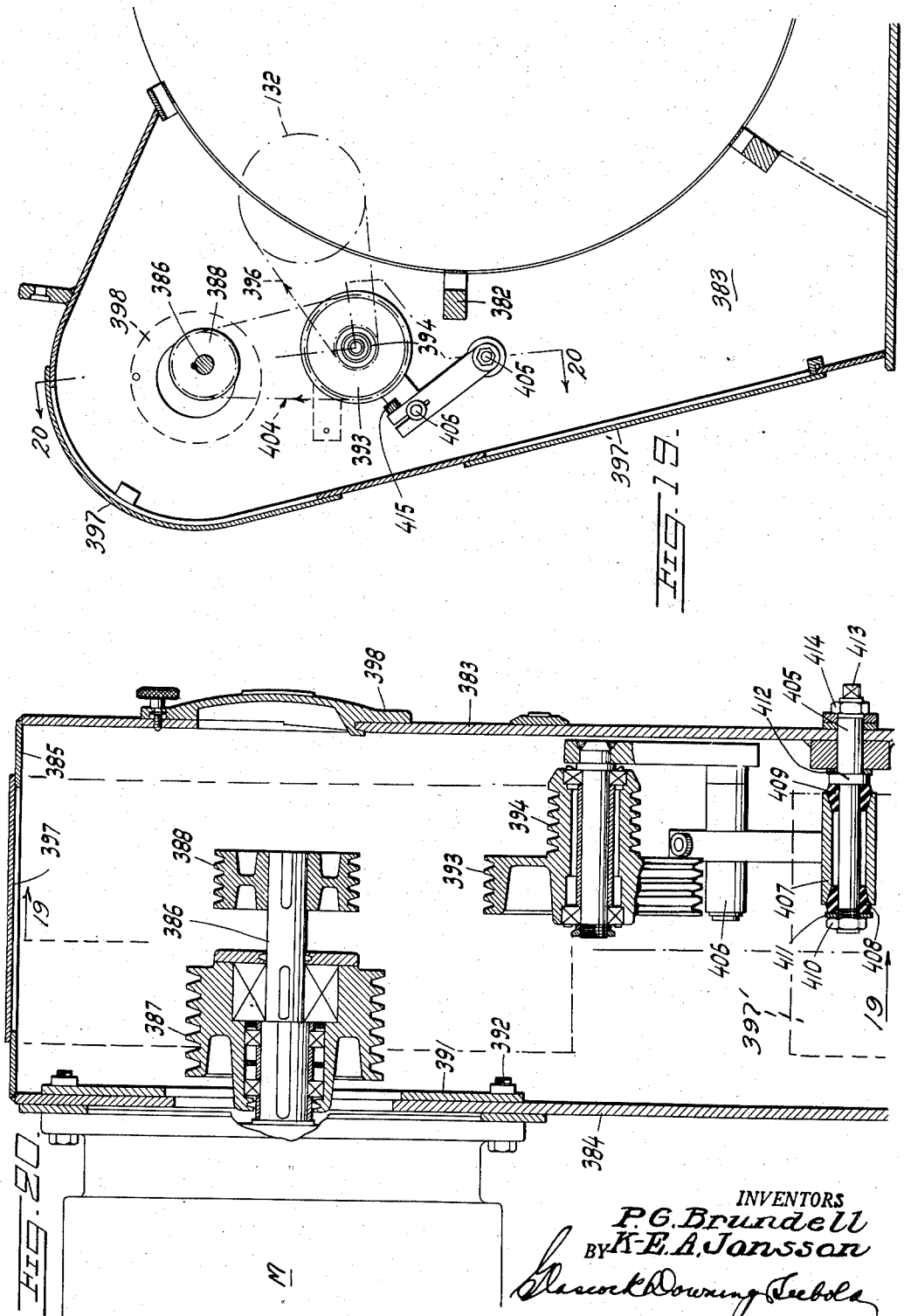

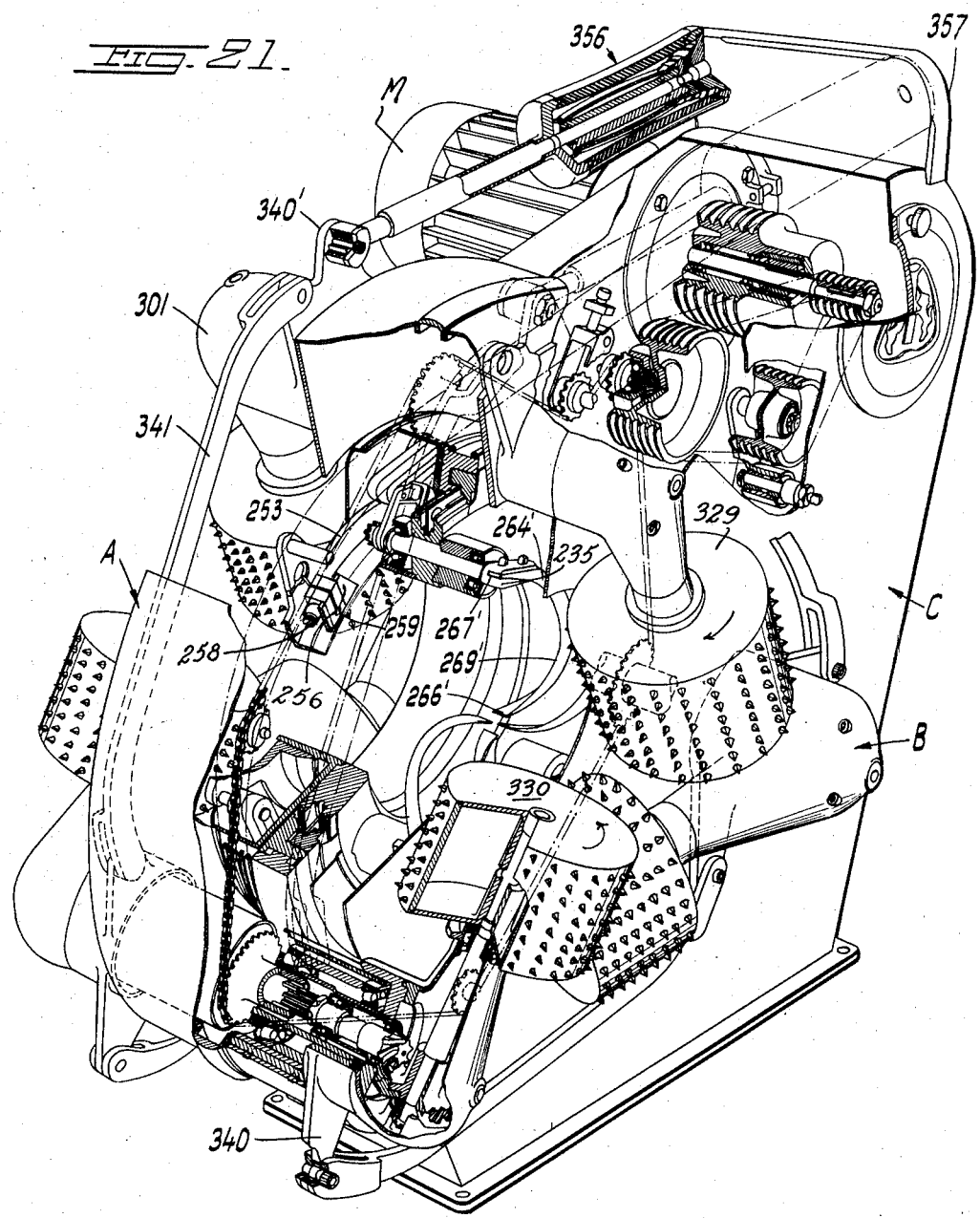

United States Patent Office 2,857,945
Patented Oct. 28, 1958
:::

2,857,945

MACHINE FOR REMOVING BARK FROM LOGS

Per Gunnar Brundell and Karl Erik Arnold Jonsson, Gavle, Sweden, assignors to Soderhamns Verkstader A. B., Soderhamn, Sweden Application March 22, 1956, Serial No. 573,279

17 Claims. (Cl. 144—208)

This invention relates to the art of removing bark from logs.

More particularly, this invention constitutes an improved debarking machine which removes the bark from logs by a scraping action.

The present application combines improved features of the type that are embodied in previously filed applications identified as follows:

Serial No. 378,738 filed September 8, 1953, now Patent No. 2,785,715 dated March 19, 1957, entitled, "An Arrangement for Feeding Forward of Logs and the Like"; Serial No. 378,982 filed September 8, 1953, now abandoned; Serial No. 417,814, filed March 22, 1954, now Patent No. 2,786,499 dated March 26, 1957, entitled "Rotary Debarker Having Pivotal Bark-Removing Tools Biased by Elastic Rubber"; Serial No. 418,854 filed March 26, 1954, now Patent No. 2,787,304 dated April 2, 1957, entitled, "Machine for Removing Bark From Logs"; and Serial No. 517,832 filed June 24, 1955, now Patent No. 2,788,034, dated April 9, 1957, entitled, "Rotary Ring-Type Debarker, Including Means for Disintegrating Slivers of Bark."

More particularly, this invention, therefore, relates to compact and complete debarking apparatuses, the constructional features of which are applicable with equal advantage in the debarking of small logs from 1" minimum to 8" maximum diameter, as well as larger logs, say from 5" minimum to 36" maximum diameter.

Further, the principles of this invention are ideally applicable for the construction of debarking machines that operate in the pulpwood range, for example on logs from 1½" minimum to 14" maximum or from 2½" minimum to 20" maximum diameters. The pulpwood logs can be of any length down to a minimum of approximately 3½'. Debarkers constructed in accordance with the invention will operate efficiently on softwoods and hardwoods. Of the latter, tests have been conducted utilizing aspen, beech, birch, linden and oak logs.

Further, the operation of the debarker is not adversely influenced by weather conditions, since it performs efficiently not only under ordinary conditions but also under conditions of severe frosts, such as at temperatures down to —20° F.

The machines constructed in accordance with this invention are not adversely influenced by irregularities in log contour. Thus, crookedness in the logs, referred to as "cat face," and protruding knots do not influence the proper operation of the machines.

Under such circumstances the principles of this invention provide surprisingly good debarking results, even when a high rate of feed of the logs to the machines, of from 100 to 200 feet per minute, depending upon the size of the machine, is utilized.

Therefore, the present invention relates to a debarking apparatus of the type wherein logs to be debarked are passed through a rotary tool-carrying head while restrained against rotation. Feed means maintain the centers of the logs in as close coincidence as possible with the axis of rotation of the head, and pivotally mounted tools continuously urged toward the axis of rotation of the head remove the bark by scraping or shearing action.

The invention, therefore, relates to an improved apparatus of the type described in the foregoing paragraph, with particular reference to a constructional arrangement of the hollow head, the means for feeding the logs through the hollow head including mounting and drive means therefor, a tool mounting, and the incorporation of a hood structure through which bark removed by the tools is ejected.

Therefore, the invention has for a primary object to provide an improved debarking apparatus of the aforedescribed type that is more compact, of lightweight construction, is easy to service, and embodies certain automatically operable features which contribute to a greater debarking capacity with sustained high-quality debarking.

It is an additional object of the present invention to provide a combination of components which include a stationary annular frame structure, a tool-carrying-head assembly including a stator and a rotor, means for mounting this assembly within the annular frame, a triangulated feed-works arrangement supported by the annular frame including a feed-roll arrangement on both the infeed and outfeed sides of the frame, and drive components housed within the frame for imparting rotation to the rotor and the rolls of the feed-works arrangement.

Other specific objects of the present invention are:

(1) To provide a compact annular frame structure which incorporates several functional relationships, including an encompassing support for the tool-carrying-head assembly, a mounting for the actuating and driving means for the feed-works components, a hood portion surrounding the tool and having an aperture through which bark is ejected, and a mounting means for components of the drive means for rotating the rotor of the tool-carrying head.

(2) To provide an extremely compact basic debarking unit that is readily adaptable for mounting on either a stationary or mobile base.

(3) To provide a frame for the annular frame that supports drive-transmitting means for transmitting power to the rotary part of the tool-carrying-head assembly and to the rolls of the feed works, supporting components for the energizing means for the feed works that positions them properly with reference to the tool-carrying-head assembly during debarking, and a support for mechanism that adjusts the power-transmitting means and maintains the transmitted power at a desired value. Specifically, the invention incorporates belt drive means and means for maintaining the tension of the same at a proper value.

(4) To provide a power-input factor constituted by a single source such as one electric motor, and a freewheeling rotary component in association therewith and operable to transmit power to the rotor of the tool-carrying assembly in one direction only while permitting reversal of the feed-work rolls.

(5) To further provide an improved base structure for supporting the annular frame that is especially suitable for stationary applications.

(6) To provide an improved hollow head assembly and means for mounting the same in the annular frame, and which assembly is extremely compact in relation to the maximum log diameter for which the apparatus is intended, the important proportions of the hollow head assembly being roughly as follows: the external diameter of the head assembly being approximately equal to the internal diameter of the annular frame and twice the maximum log diameter; the external diameter of the annular frame being three times the maximum log diameter for which the apparatus is intended; the total length of the tool-carrying-head assembly in a direction axially of the log being equal to the maximum log diameter; the external diameter of the bearing means in which the rotor of the head assembly is journaled being approximately 1 and ½ times the maximum log diameter; the radial distance between the pivot axis of a debarking tool and its tip being approximately ⅔ of the maximum log diameter, a prolongation of the path traveled by the tool tip being such as to pass through or closely adjacent the center of the axis of rotation of the tool-carrying head; the number of the debarking tools being 5 or less; the radial distance from the pivot axis of a tool to the center of a pin, connected with each tool and receiving force to urge the tool inwardly, being ⅓ of the radial distance from said pivot axis to the tip of the tool, the center line of the force acting on the pins to urge the tools inwardly being approximately perpendicular to a line that connects the center of the pin with the pivot axis of the tool when the tip of the tool is close to the axis of rotation of the head; the tool incorporating a debarking blunt edge having an extension parallel with the longitudinal axis of the log of from ⅟₁₀ to ⅟₂₀ of the maximum log diameter, and the number of revolutions per minute imparted to the rotor of the tool-carrying-head assembly being such that the speed of travel of the tip of a tool on the wood surface of a log of the largest diameter for which the apparatus is intended being 15 to 35 feet per second.

(7) To provide the hollow head assembly with an improved sealing arrangement including a sealing arrangement between the rotating and stationary components of the head assembly, and another sealing arrangement between the stationary part of the head assembly and the annular frame.

(8) To incorporate in the head assembly a sturdy and compact annular member constituting a rotor which is provided with symmetrically spaced apertures therethrough disposed parallel to the axis of the annular frame, and to incorporate within these apertures bushing means which include cylindrical neck portions disposed on opposite sides of the rotor and which neck portions accommodate antifriction bearing means for journaling a tool-carrying shaft which passes through each aperture in the rotor.

(9) To incorporate in the hollow head assembly an annular component including a portion bolted to one face of the rotor and carrying means partaking in the adjustment of and limiting of the force applied to tool shafts to urge the tools toward the axis of the rotor, and further including a cylindrical surface for accommodating a belt drive for transmitting power to the rotor to rotate the same.

(10) To incorporate in the head assembly a simple, compact and unique arrangement for altering or maintaining the force applied to pivot the tools and at the same time to protect the components on the outfeed side of the hollow head assembly against penetration of bark, dirt and dust.

(11) To provide the outer periphery of the rotor with grooves accommodating 2 of 4 wires that constitute races for a large single-row ball bearing that journals the rotor and which likewise fixes the rotor axially and radially, and to incorporate an improved stator arrangement surrounding the rotor in which stator is one groove for one of the other two wires that forms the outer race for the ball bearing, and adjustably associating with the stator a ring member having a groove for the fourth wire forming the bearing race so that the ring member can move toward and away from the stator to provide a simple and precise, uniform and parallel adjustment of the races in relation to an evenly spaced series of steel balls to provide a low-friction bearing means with little or no play, and to further include a locking device constituted by a single screw for fixing the position of the races.

(12) To provide an improved mounting for connecting each tool to its associated shaft.

(13) To provide an improved tool structure for connection with each shaft.

(14) To incorporate on the infeed side of the tool-carrying-head assembly vanes or wings for ejecting bark, including means fixing each of the wings to a protruding neck that accommodates the journaling means for the tool-carrying shaft.

(15) To provide an annular shield for fastening to the annular frame, and a simple lock structure for securing this shield in place without the use of any screws or bolts.

(16) To provide within the annular frame an annular chain-accommodating space and three symmetrically spaced sprockets disposed within this space, each for transmitting rotation to two feed rolls respectively mounted one on each face of the annular frame.

(17) To incorporate within the annular space a unique sealing arrangement that protects the chain and the aforementioned sprockets or pinions from dirt, and further permits the chain to run through an oil bath.

(18) To provide a continuous flow of oil from the oil bath to the large annular ball bearing journaling the hollow head.

(19) To provide a compact assembly for supporting the feed rolls, and transmitting power to the same for feeding the logs, and accommodating an automatic opening of the rolls when the end of a log is pushed thereagainst, and which assembly comprises a hub, bearing means for pivotally supporting the assembly, a hollow arm housing gear means and a roll-supporting shaft and providing a sealed oil bath for the same, means connected between the respective arms for transmitting and receiving impulses from the other two feed rolls in each set of three rolls to maintain all rolls in a set in the same position relative to the center line of log travel, and which last-mentioned means further transmit force to the arms and thus to the feed rolls to continuously urge the same toward the center line of log travel.

(20) To incorporate for each set of three feed rolls at least one tube-shaped elastomer spring for continuously and elastically actuating each set of feed rolls, and synchronizing links mounted externally of the annular frame and connected with the arms carrying the feed rolls for transmitting the force of the spring.

(21) To provide within the tube-shaped elastomer member means for hydraulically damping rapid motions, and resilient means for stopping the spring movement at one point, thereby causing the three arms embodied in each set of feed rolls to stop at a distance from each other and thus to stop the inward movement of the rolls at a distance selected with respect to the minimum log diameter.

(22) To provide means for attaching each feed roll to its shaft, said means incorporating resilient means preventing the transmission of shock loads and vibrations to the assembly.

Figure 9:
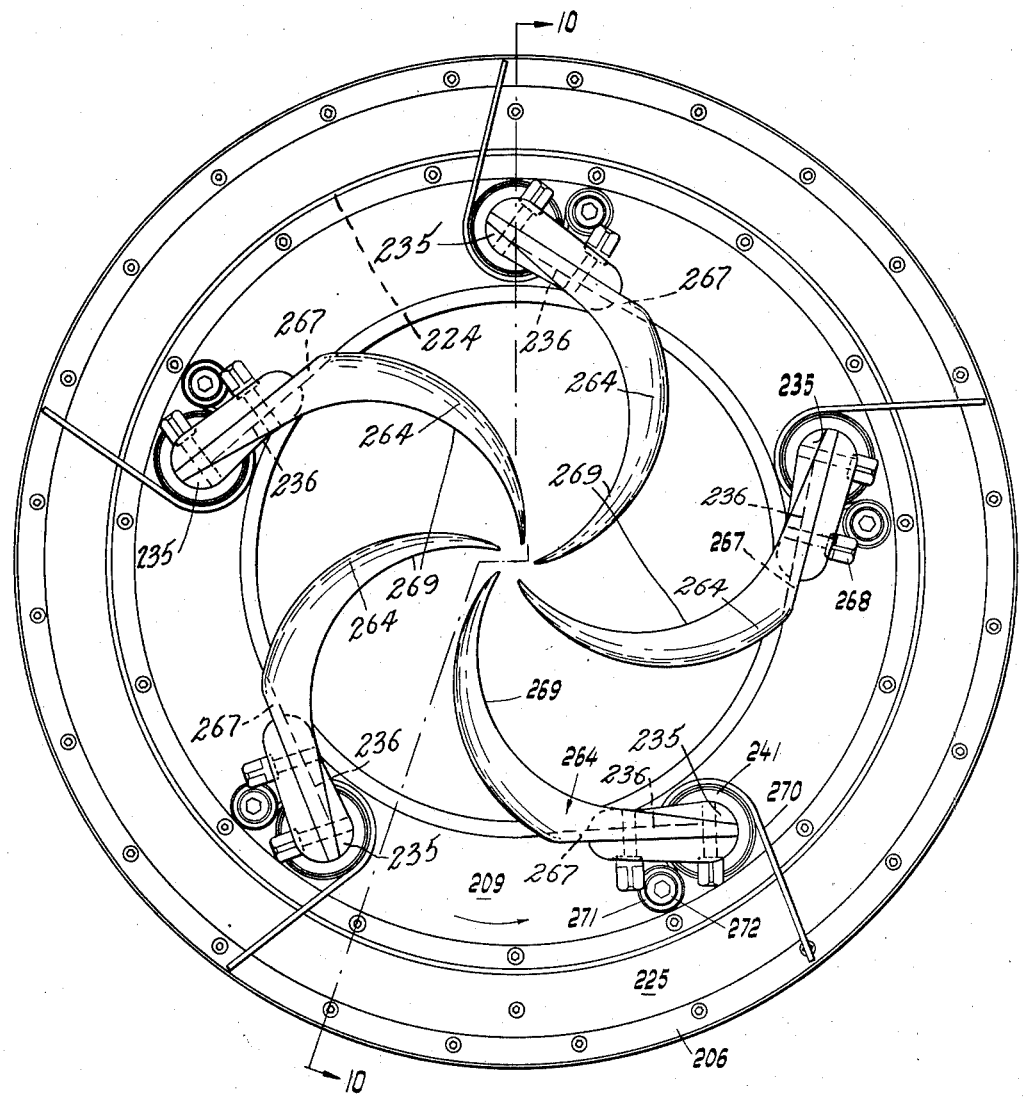
Figure 10:
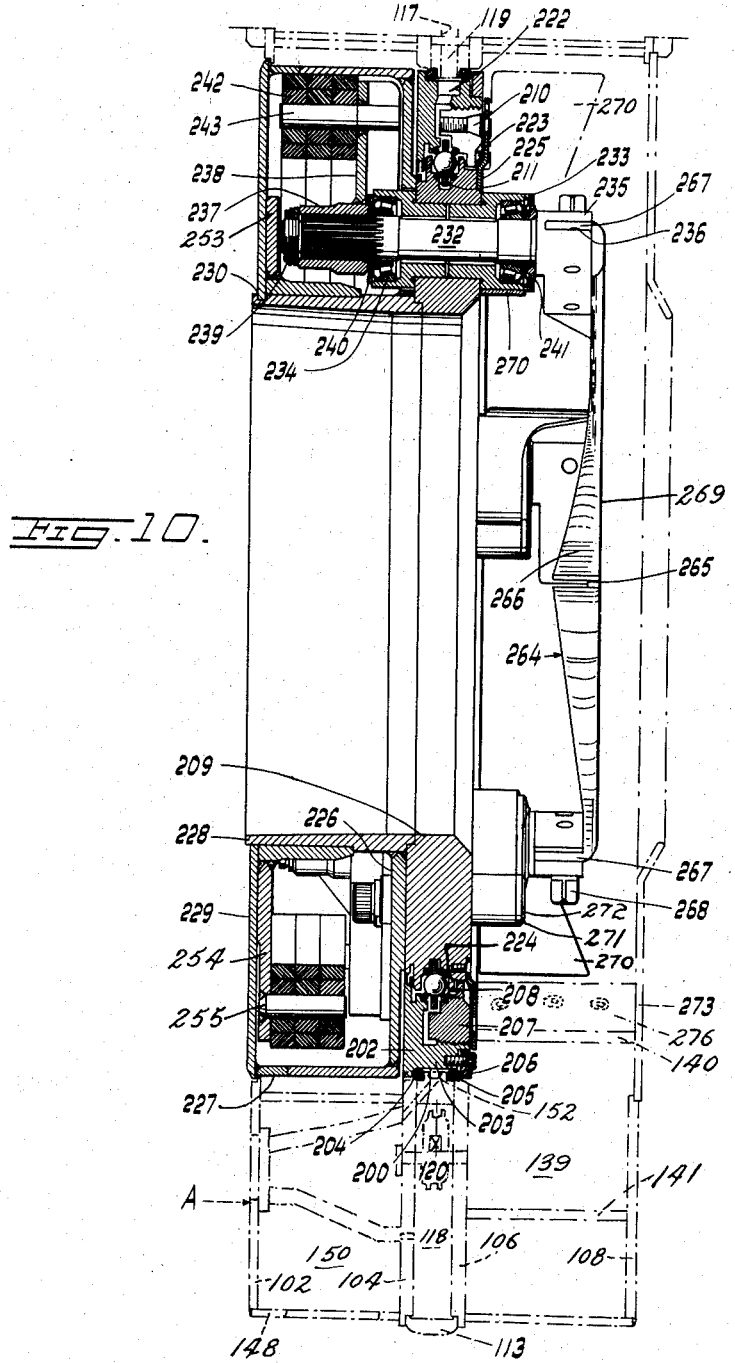

Further and more specific objects and advantages of the present invention will be readily apparent from the following description taken in connection with the accompanying drawings disclosing embodiments of the invention and in which:

Figure 1 is an end elevation of the infeed side of the debarker constructed in accordance with this invention, Figure 2 is a side elevation of the arrangement of Figure 1 as viewed from the left, Figure 3 is a plan view of the arrangement of Figure 1, Figure 4 is an end elevation partly broken away to show parts in section, and illustrates the infeed side of an annular frame, Figure 5 is a cross-sectional view on an enlarged scale taken along lines 5—5 of Figure 4, Figure 6 is a cross-sectional view on an enlarged scale taken along lines 6—6 of Figure 4, Figure 7 is a cross-sectional view on an enlarged scale taken along lines 7—7 of Figure 4, Figure 8 is a transverse, vertical sectional view taken through the annular frame in the bark-ejecting space thereof, Figure 9 is an enlarged-scale end elevation of the tool-carrying-head assembly as seen from the infeed side, Figure 10 is a multiplanar, longitudinal cross-sectional view of the tool-carrying-head assembly with some parts shown in elevation and is taken along lines 10—10 of Figure 9, a portion of the annular frame being shown in dot-and-dash lines.

Figure 11:
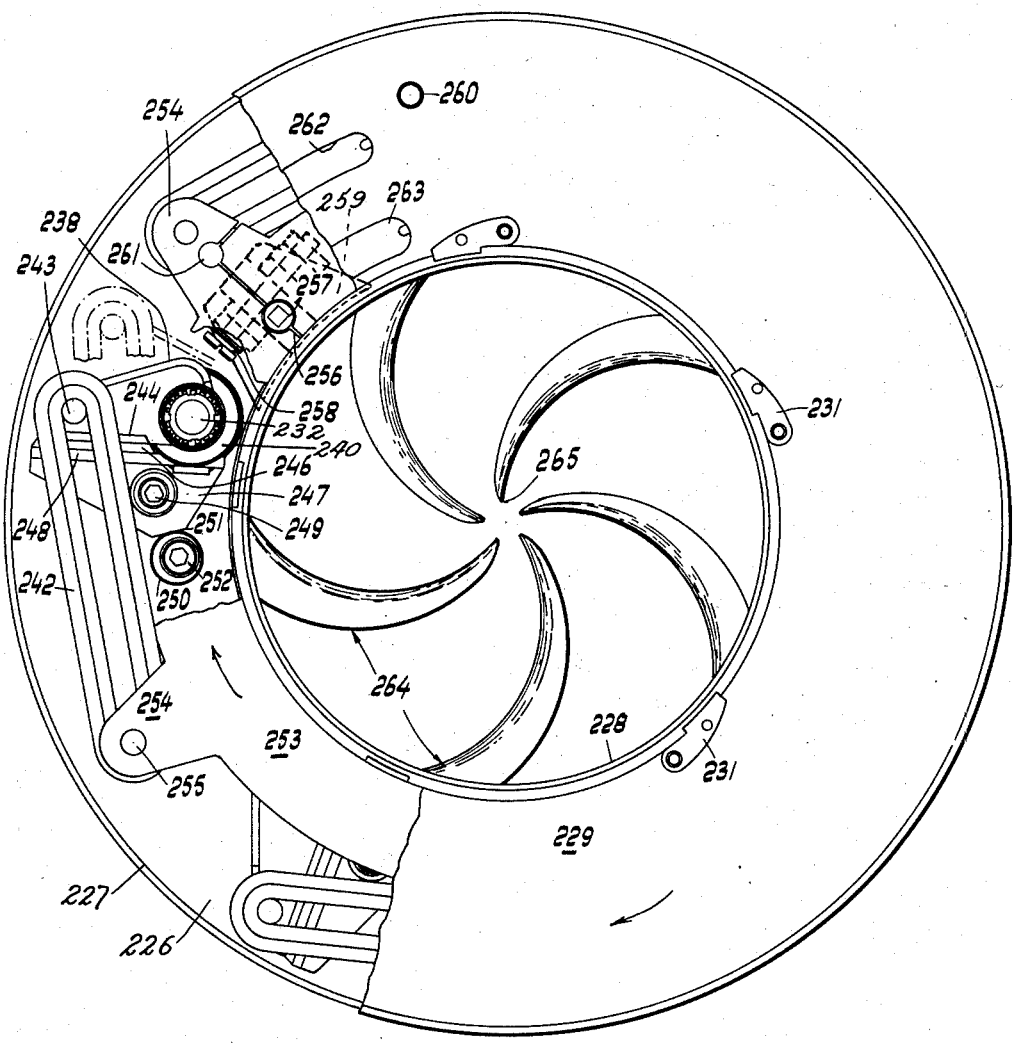
Figures 15, 16:
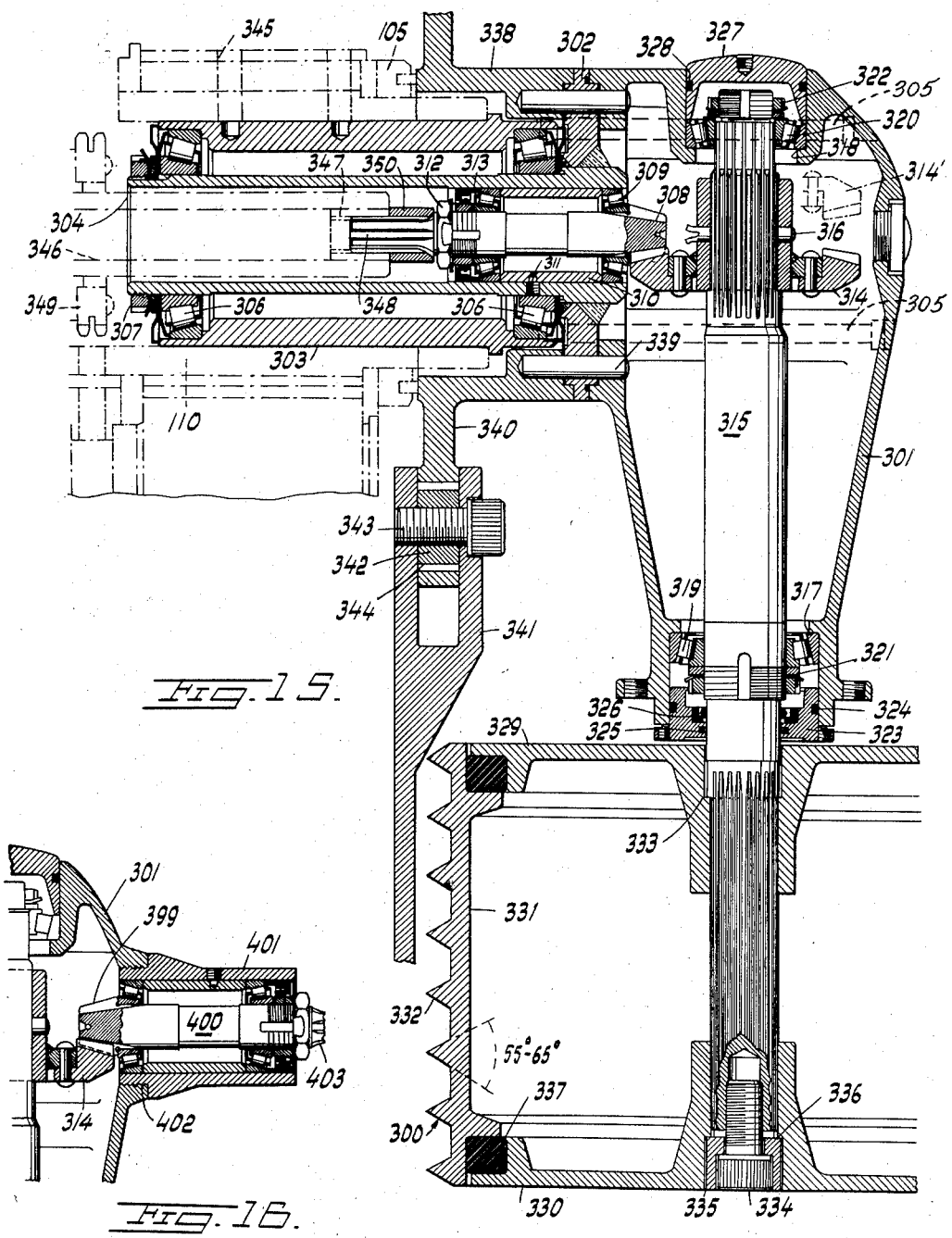

Figure 11 is an end elevation of the outfeed side of the hollow head assembly, parts being broken away to show details of resilient means for biasing the tools toward their innermost positions, Figure 12 is an enlarged-scale perspective view of an improved tool as it appears from the infeed side of the assembly, Figure 13 is a perspective view of the tool from the outfeed side of the assembly, Figure 14 is a cross-sectional view taken along lines 14—14 of Figure 13, Figure 15 is a fragmentary, enlarged-scale, longitudinal sectional view taken through a feed-arm assembly and illustrating in detail one of the feed rolls, Figure 16 is a fragmentary, longitudinal sectional view illustrating a power take-off associated with one of the feed-roll-carrying arms, Figure 17 is a fragmentary top view partly in horizontal section illustrating one form of tube-shaped elastomer-spring means for applying force to the feed-roll-carrying arms to urge them inwardly.

Figure 18 is a vertical, transverse sectional view taken through one form of base for supporting the annular frame, and diagrammatically illustrating the frame supported therein and the drive for the rotor, as viewed from the infeed side, Figure 19 is similar to Figure 18, but shows the stationary base as viewed from the outfeed side, as indicated by arrows on the section line 19—19 in Figure 20, Figure 20 is a fragmentary, enlarged-scale, vertical, longitudinal section taken through the top portion of the base, as indicated by the multiplanar section line 20—20 in Figure 19, Figure 21 is a view in perspective, with parts broken away, illustrating a modified debarking apparatus embodying the principles of the invention.

As illustrated in the drawings, the improved characteristics of the present invention provide a unique combination of components that results in a compact, lightweight, readily serviceable debarking machine. The debarking machine of the invention incorporates an annular frame, a tool-carrying-head assembly including a stator carried by the frame and a rotor within the stator carrying the tools, means for mounting the tools on the rotor for pivoting movement about axes parallel to the axis of rotation of the rotor, means for normally urging the tools toward the axis of rotation of the rotor, infeed and outfeed mechanisms supported by the annular frame on the respective faces thereof, means for driving these mechanisms to not only feed logs through the rotor but to center the same therein, mechanisms for urging the roll components of the feed mechanisms toward the axis of rotation of the rotor and for synchronizing the movements of the individual components of the respective feed mechanisms, and means for supporting the stationary frame.

A debarking machine embodying the aforementioned features is illustrated in Figures 1 to 3, in which the stationary annular frame is denoted at A. The tool-carrying assembly housed within the frame is not visible in these figures. The log-infeed and log-outfeed mechanism is denoted generally at B, while one form of base structure that supports the annular frame is denoted at C.

In utilization, the logs are fed from right to left in Figure 2 and in advance of the infeed mechanism is a suitable log conveyor which delivers logs end-to-end to the rollers of the infeed mechanism, while beyond the feed rolls of the outfeed mechanism is an additional conveying means which delivers debarked logs for piling or other disposition. Since any one of the conveying arrangements or log hauls known in the art can be operatively associated with the debarking machine of this invention, the same have not been illustrated.

*The stationary annular frame*

The stationary annular frame A is more clearly illustrated in Figures 4 to 8. This annular frame is a multi-purpose frame, and includes four symmetrically apertured sheet-metal rings 102, 104, 106 and 108. These rings have three equispaced apertures therein within which is disposed three thick-walled tubes 110, 112 and 114. The axes of the three tubes are perpendicular to the flat surfaces of the four sheet-metal rings and they form apices of an imaginary equilateral triangle, the center of which coincides with the center line of log travel. The sheet-metal rings are spaced axially from one another. Spacer means 103 are welded between rings 102 and 104 and to the outer surface of the respective tubes. Additional spacer means 101 are welded between rings 106 and 108 and to the exterior of the respective tubes. Collars 105 surround the end of each tube that protrudes beyond the opposite end rings 102 and 108, respectively. The spacing of the rings axially of one another is such that the rings 104 and 106 are closely spaced, and halfway between the ends of the respective tubes there is provided a slot 116 that extends perpendicularly to the axis of the tube and occupies more than one-half the circumference of each tube. The purpose of this slot will be set forth hereinafter, and each slot faces a direction opposite to that extending toward the center of the imaginary triangle referred to above.

The arrangement just described results in an annular space 118 being formed between the two innermost rings 104 and 106. This space is closed at its inner periphery by a circular strip 120 which is welded to the two inner rings. The outer periphery of this space is partially closed by evenly spaced segments 122 of a circular strip that has the same width as the strip 120. The openings between these segments provide access to the annular space 118. This annular space accommodates the sprockets and chain of a chain transmission for the feed works, which will be described hereinafter. The chain is denoted diagrammatically at 126 in Figure 4, and is driven by a sprocket 128, Figure 7, attached to a shaft 130, the free end of which carries a V-belt sheave 132. The shaft 130 is journaled in ball-bearing means 134 carried by cup members 136 that are sealed within aligned apertures in the central sheet-metal rings 104, 106. The cup members are mounted in rings 138 that are welded to the outside of the immediately aforementioned sheet-metal rings. The preferred mounting of the multipurpose frame is such that the plane of the imaginary equilateral triangle is vertical with the side thereof nearest the ground being horizontal. This means that the thick-walled tube 110 is at the top of the frame, while the other two tubes 112 and 114 are at the lower part thereof and on the same level and the respective tubes are 120° apart.

The frame, from right to left in Figures 5 to 7, includes a partially cylindrical and partially planar strip 140 that is welded between the outfeed side of ring 108 and the infeed side of ring 106 near the inner periphery thereof. This strip 140, as shown in Figure 8, constitutes a hood for the collection and ejection of bark in a direction tangential to the inner circumference of the sheet-metal ring. Spanning the outer peripheries of the rings 106 and 108 and welded thereto, is a partially cylindrical strip means 141. The strip means 141 is omitted between two adjacent thick-walled tubes so as to provide an outlet for an ejection spout. As shown in Figure 8, the inner strip means 140 has its planar end portion connected to one end of the strip means 141 so as to define one side of the ejection spout, while a short plate member 139 is welded between the other end of strip 140 and the adjacent end of strip means 141. The ejection spout can be disposed to eject the bark downwards, as shown in Figures 1 and 8, or, if desired, it can be disposed between the tubes 110 and 114 so as to eject the bark sideways, in which case access to the debarking tools is readily gained through the ejection spout.

When the bark is ejected downwards, as shown, it is necessary to provide an access opening as at 137. This opening can be closed by a closure means 143, the inner face of which functions as part of the bark-collecting hood. An additional lid or closure 135 closes the space between two adjacent strip means 141 that closes the outer periphery of the space between the rings 106 and 108. A gap is provided as at 144, which is cut out of the strip means 141 to accommodate the V-belt sheave 132 that drives the sprocket 128 that turns the chain 126. A multigrooved V belt 396 for turning the sheave 132 is shown diagrammatically in Figure 19.

The outer periphery of the space between sheet-metal ring 104 and sheet-metal ring 102 is closed by a strip means 148. There is a gap 147 in this strip in the same position as the gap 144 that accommodates a multigrooved V belt 133, diagrammatically illustrated in Figure 18, for turning the rotor of the hollow head assembly.

The inner circumference of the space between sheet-metal rings 104 and 102 is not closed. Instead, six straight metal strips 150 are welded between the two sheet-metal rings to extend tangentially from opposite sides of each of the thick-walled tubes and in welded connection with the inner periphery of the outer strip means 148. Two similar strip means 150′, illustrated in the upper right hand portion of Figure 8, are disposed between the plates 106 and 108 to form the sides of the gap 144 that accommodates the V belt 396 for the sheave 132 that drives the sprocket 128 that drives the chain 126.

The circular strip 120 that closes the inner periphery of the space 118 is machined to form axially spaced flanges 152 which partake in the mounting of the tool-carrying-head assembly within the annular frame.

*The tool-carrying-head assembly*

The tool-carrying-head assembly D is illustrated in Figures 9 to 11, and comprises a stator, a rotor carrying five pivotally mounted tools, bearing means for the rotor and actuating means for the tools. The stator comprises a flanged ring member 200. The ring includes an external flange 201 and an internal flange 202. The ring is L-shaped in cross section and the base 203 of the L, as viewed in Figure 10, is internally threaded. The stator is mounted within the annular frame by sliding it in from left to right, in Figure 10, until the flange 201 bears against a giant O-ring packing 204 that bears against one of the flanges 152 on the ring member 120. An additional O-ring 205 is disposed between the other flange 152 and the outer periphery of the part 203 of the stator. A locking ring member 206 is then bolted to the face of the stator.

The stator is completed by an externally threaded ring-shaped giant screw 207 that is threaded within the internally threaded part 203 of the ring 200. On confronting faces of the flange 202 and the screw ring 207 are formed grooves for accommodating the outermost pair of wires 208 that define running surfaces for a four-point ball bearing. The other two running surfaces are provided by similar wire rings housed in grooves formed on the outer periphery of a sturdy rotor ring 209. By rotating the ring-shaped screw 207 the outer two wires can be moved toward one another until they press the balls of the bearing against the two inner wires. If the pressure is high enough the balls will exert a cold-rolling action on the four wires during the first few revolutions of the rotor. This cold-rolling action will provide running surfaces on the wires having a mirror finish and conforming to the curvature of the balls. The ring-shaped giant screw 207 is split and in the center of the split is disposed a conical screw 210. By turning this screw the giant screw 207 can be expanded whereby it is efficiently locked in the threads formed on the interior of the part 203 of the stator. If the running surfaces of the wires are worn to a degree that sets up play, the bearing is readily tightened by loosening the conical screw 210 and turning the giant screw 207. The individual balls in the ball bearing can be separated by separators 211, as shown. However, the bearing may operate successfully without the use of any ball separator, thus reducing the costs of the bearing.

The giant O rings 204 and 205 are made from oil-resistant rubber and they are held in place by the force applied when the ring 206 is moved toward the flange 201. The fastening of the stator, and thus the hollow head assembly, within the annular frame A by interposing the giant O rings in the mounting avoids metallic contact between the head assembly and the annular frame. In addition, the machining of the different flanges can be made without worrying about close tolerances, since the elastic joint prevents the possibility of transmitting any distortion in the welded annular frame to the head assembly. Furthermore, the giant O rings, being elastic, provide an efficient sound stop or dampening means for the sound that is generated by a large ball bearing, the debarking machine of the invention being, therefore, comparatively quiet. The giant O rings further function as a seal for the oil that lubricates the ball bearing.

The sump for the oil is formed in the space 118 between the two middle rings 104 and 106 of the annular frame. The oil is lifted from the sump by the chain 126. Part of the oil carried by the chain is discharged through the slot 116 into the uppermost thick-walled tube 110. The oil flows down into the bottom of the tube and thence by gravity through a hole 117 in the bottom of the tube 110, thence through a conduit or hole 119 in the strip member 120 to a conduit or hole 222 formed in the part 203 of the stator. The oil then flows through the ball bearing to discharge through outlet holes, not shown, on each side of the bottom point of the stator. The oil thus gets in the space between the flanges 152 at the bottom of the assembly. A discharge opening 153 see Fig. 6 is formed in the bottom of the ring 120 which, through a hole formed in ring 104, communicates through a pipe conduit means 154 that leads to a sight-glass structure 155 and thence through a pipe 156 and another hole through sheet metal ring 104 to the sump formed in the space 118. Thus, through the sight glass 155 the flow of oil and the oil level can be checked. To prevent oil from leaking between the rotor and the stator of the tool-carrying-head assembly, these components are provided with tongues 224 which form a labyrinth seal. On the infeed side of the rotor 209 there is a further mechanical seal comprising a thin conical metal ring 223 resiliently pressed against and thus sliding on the infeed face of the screw ring 207. This thin metal ring or lip is shielded or guarded by a thicker ring 225 that is bolted to the rotor, the ring 225 shielding the sealing lip or ring from the impact of pieces of bark.

The spaces between the segments 122 provide access to the interior of the space 118 between the middle sheet-metal rings of the frame. As shown in Figures 5 and 6, the middle rings of the frame are flanged or shouldered at their outer periphery and a heavy synthetic rubber ring 113 is applied over the outer periphery of the segments 122 so as to close and seal the space 118 and to prevent leakage of any oil from the sump.

The drive for the hollow head is transmitted by a V-belt arrangement. The V belt 133 can be of the type embodied in U. S. Patent No. 2,728,239 to Adams, so as to ensure adequate power transmission. The rotor 209 has bolted to the face thereof on the outfeed side of the apparatus a sheave structure comprised by an apertured annular member 226, an interconnected sheave member 227 and an internal and interconnected, slightly conical hub member 228. These three components are welded together and the exterior of the sheave member 227 receives the power transmission belt 133. The external diameter of the sheave is approximately the same as the external diameter of the stator member 200. The minimum internal diameter of the hub member 228 is the same as the internal diameter of the rotor 209. At the outfeed end of the hub 228 is fastened a thick metal lid 229. The lid is fastened in place by a bayonet joint. The outer periphery of the lid is so dimensioned as to rest on the rim of the sheave member 227 so as to enclose a hollow annular space on the outfeed side of the tool-carrying-head assembly. Within this space is located the means for applying force to the tools to urge them inwardly and means for limiting the inward movement of the tools. As shown in Figure 11, the hub 228 is provided with circumferentially spaced cut-outs communicating with a groove 230. The internal periphery of the lid 229 has inwardly extending lugs thereon. These lugs fit through the cut-outs and then the lid is turned to dispose the lugs within the groove, following which pivotally mounted latches 231 are swung inwardly to engage in the cut-outs to hold the lid in place.

The debarking tools are carried by shafts 232, each parallel to the axis of the rotor and passing through circumferentially spaced apertures in the rotor 209. Within each of these apertures are disposed a pair of bushings 233 having internal seats for heavy tapered roller-bearing means 234 that journal the shaft. The bushings can either be welded within the apertures in the rotor or press-fitted therein. As viewed from the right in Figure 10, the end of the shaft 232 carries a wing-shaped head 235 having a milled groove 236 therein for receiving a flange on the debarking tool. The opposite end of the shaft is splined for a distance beyond the left-hand bushing 233 and has a reduced, externally threaded terminal end. A tool-actuating and stopping lever includes an internally splined tubular portion 237 and a lever portion 238. The internally splined portion is fastened over the splined end of the shaft 232 and a flat nut 239 is engaged over the externally threaded terminal end of the shaft. By tightening this nut the two tapered roller bearings 234 can be tightened against each other, if desired. The nut is held in place by a suitable lock washer. Each of the roller bearings is provided with double seals 240, each seal consisting of two thin metal rings clamped to the inner rings of the bearing, the outer lips of these thin metal rings being resiliently pressed against and in sliding contact with the end face of the outer ring of the bearing and the end face of the left-hand bushing, respectively. This clamping force is exerted by the internally splined portion of the lever on the left of the bearing in Figure 10, and by a closure ring 241 arranged within the other bushing, this ring preventing mechanical damage to the seal by shielding the same from chunks or pieces of bark. The torque transmitted to the tool shafts to effect the desired pressure of the tips of the tools against the wood surface of a log being debarked is generated by rubber means such as endless rubber straps or bands 242. Accordingly, from the face of each lever 238 extends a comparatively long pin 243, each pin being parallel with its associated tool shaft 232. To prevent the shaft from turning further than required with regard to the minimum log diameter, each lever part 238 is provided with a flat face 244. This flat face 244 bears against a rubber cushion 246 that is bonded to a stop member 247. The stop member is triangular in elevation and is of L shape in cross section, having an outwardly directed flange 248 to which the rubber cushion 246 is bonded. Centrally of the triangular portion of this stop member is an aperture accommodating with clearance a large screw 249 that is fastened in the rotor ring 209. By tightening this screw, the head of which bears against a washer on the exterior of the stop member 247, the latter is clamped to the outfeed face of the annular member 226 that forms part of the driving sheave. When this screw is loosened the triangular stop member, and thus the rubber cushion 246, can be moved a distance determined by the clearance between the hole and the screw. To insure that the rubber cushion 246 is maintained in parallelism with the corresponding surface on the lever 238, when regulating the position of the tools for minimum diameter, the stop member 247 is provided with a machined cylindrical notch on the face thereof bearing the rubber cushion 246. The diameter of this notch is the same as the outside diameter of the bushing 233 that is on the outfeed side of the rotor. When this cylindrical notch slides in contact with the bushing the rubber cushion 246 and the flat face 244 are always maintained in parallelism. In order to provide for fine adjustments the clamping screw 249 is loosened and an eccentric washer 250 is turned. As shown in Figure 11, the face of the stop member 247 opposite the rubber cushion is flattened as at 251, and the eccentric washer 250 bears against this flat surface. When the tool tip has reached its desired inward position the eccentric washer is clamped in position by tightening a screw 252 that is threaded into the rotor ring 209, there being a suitable hole in the annular ring 226 to accommodate this screw. After the two clamping screws have been tightened the eccentric washer serves as a protection against any undesired movement of the rubber cushion 246 occasioned by heavy blows from the lever 238 upon rapid swinging movements of the tool 264 to its innermost position.

The tensioning of the rubber straps is applied and regulated as follows:

On the outer periphery of the hub 228 there is a carefully machined cylindrical surface providing a seat for a ring member 253. This ring member is L-shaped in cross section and includes a cylindrical portion parallel with the axis of the machine and engaged on the cylindrical suface of the hub. The annular flat portion of this member 253 extends perpendicularly from the rotor hub 228 and is disposed very close to the interior of the lid 229. At the outer periphery of this part of the ring member are five triangular projections or lugs 254. Pins 255 are welded to each of these five projections and these pins extend parallel to the pins 243 but toward the annular member 226 of the rotor. Around each of the associated pins 243 and 255 are trained the rubber straps 242. At the center line of one of the triangular projections or lugs the L-shaped ring 253 is provided with a radial cut or split 256. This cut is enlarged intermediate its length and disposed therewithin is an eccentric 257, making it possible to expand the ring to loosen the same on the surface of the hub and to permit the ring to shift its position in a manner later described. The contraction force applied to the ring to fasten it to the hub is exerted by a pack of Belleville springs 258 associated with lugs 259 carried by the back side of the ring 253.

It is therefore seen that when this ring is moved on the machined surface of the hub in relation to the other components carried by the rotor, the rubber straps 242 can be stretched or slackened to provide a desired tool pressure.

The movement of the L-shaped ring 253 is effected as follows:

The force for stretching all the rubber straps on the rotor is comparatively high and is generated by a hydraulic jack of the type that can be used for automobiles. Such a jack consists of an oil reservoir and a lever-operated hand pump arranged at the end of a long tube, the interior of which constitutes a cylinder for a long plunger having a diameter of approximately 1". At the end of the tube and at the end of the plunger are lugs facing in a direction approximately perpendicular to the longitudinal axis of the plunger. The lid 229 is provided with a cylindrical hole 260 and the triangular lug 254 adjacent the split portion of the ring 253 is provided with a similar hole 261. The lug on the cylinder of the jack is introduced into the hole 260 and the lug on the tip end of the plunger is introduced into the hole 261, access to this hole being furnished through a slot 262 in the lid. When oil is pumped into the cylinder the force of the plunger counteracts the contracting force exerted by the pack of Belleville springs 258. When the plunger is moved further the friction grip between the inner periphery of the ring member 253 and the machined surface on the hub 228 is loosened and the ring 253 can now slide on the hub. The force of the hydraulic jack is now almost entirely utilized to stretch the rubber straps. When the desired tension in the straps has been attained the oil pressure in the cylinder of the jack is released by a small control valve provided therewith, the Belleville spring packet coming into operation instantly to contract the ring 253 to a positive friction grip on the hub at the new position attained by the ring 253.

To decrease the tension in the rubber straps the following procedure is followed:

The eccentric 257 is provided with a square socket, gripping access to which is gained through another slot 263 in the lid 229. When the eccentric is turned by turning the handle of an angular lever, which has a square stud that has been engaged in the socket of the eccentric, the ring 253 is expanded. The friction between this ring and the hub is then overcome by the tension in the rubber straps 242 and the ring 253 tends to move in relation to the hub to decrease the tension of the straps. The eccentric and lever carrying the stud are so arranged that when the tension ring moves and the tip of the lever or handle thereof is held in a fixed position by hand, the eccentric turns in such fashion that the tension ring 253 is contracted and stopped. In this way the movement of the tension ring 253 is quiet and controlled.

The rubber straps are preferably made from natural rubber and are so designed that at maximum elongation the distance between the two pins around which the straps are passed is 280% of the corresponding distance when the straps are not under tension. The elastic properties of the rubber should preferably be such that the stress in the straps calculated on their cross-sectional area under no tension should be in the range of 200 to 400 p. s. i. at maximum elongation.

The five debarking tools 264 are fastened on the infeed ends of the tool shafts 232. These tools are crescent-shaped in elevation when viewed from the infeed side Figure 9. The planes of the crescents lie in a plane perpendicular to the axis of rotation of the rotor. The debarking portion of each tool consists of a blunt edge 265 at the tip of each tool. This edge extends substantially parallel with the axis of rotation of the rotor. The tool is further so shaped that the edge forms the end of a triangular deflecting surface 266 that follows the convex trailing portion of each tool for some distance from the tip thereof toward the shaft 232. The outer end of each tool is provided with a machined tongue 267 that fits in the milled slot 236 in the wing-shaped head 235 on the end of the tool shaft 232. Two parallel screw-receiving holes extend through the tongue 267 and the slotted portion of the head 235, the axis of one of the holes extending diametrically through the pivot axis of the tool shaft 232, and the innermost portions of these holes being threaded to receive threaded ends of two screws 268 which secure each tool 264 to its shaft 232.

Along the concave or leading part of the tool 264, the concavity having a radius of curvature roughly equal to one-half the radial distance between the tip 265 and the axis of the shaft 232, there is a sharp edge 269 that is somewhat protruding in the direction facing an oncoming log. In a direction extending parallel to the axis of the rotor, the tool is made very thin in order to present the smallest possible cross section to the flow of bark. The radial distance from the tip of the tool to its pivot axis is roughly ⅔ of the diameter of the opening in the rotor. This opening also determines the maximum diameter of the log to be debarked. The angular distance traveled by the tool shaft when the tip of the tool moves from its innermost position to its outermost position is almost, or approximately, 45°. In spite of this substantial angle of turn, it is possible to accommodate five tools on the rotor. A prolongation of the path of travel of each tool tip 265 passes near or through the axis of rotation of the hollow head of the rotor. When each tool 264 swings outwardly, its trailing edge does not reach the head 235 of the next adjacent tool, so that the tip of the tool can move freely even on the biggest logs. Thus, in fulfilling this important condition, a maximum of five tools can be accommodated on the rotor. By employing an actuating force that considerably increases as the tool arm swings outwardly through a turning angle of 45° and by utilizing a light-weight, but sturdy, tool, the ratio between the actuating force and the inertia of the pivoting system for any given position of the tool arm, is raised considerably over what has been known before, with the result that the tip of the tool is capable of very fast acceleration in order to follow or accommodate irregularities in log and bark contour. Further, without impairing good debarking action, the rotational speed of the rotor can be raised to a surprisingly high value. For instance, a rotor dimensioned for debarking 14" maximum-diameter logs can accomplish excellent debarking results even at a rotational speed of 500 revolutions per minute, which corresponds to a linear speed of the tool tip of over 30 feet per second over the surface of a log of maximum diameter. A machine constructed for debarking 26" maximum-diameter logs can operate efficiently at a speed of 250 revolutions per minute. Such high rotational speeds render possible a high linear-feed rate under almost any condition. The effectiveness of the machine is so high that even frozen wood can be fed at a high rate of speed which can fall in the range of 100 to 200 feet per minute.

The rotor operates as follows:

When a log is fed against the tools by the feed works on the infeed side, the protruding sharp edges 269 on the tools engage the butt end of the log. When this happens there are three possibilities: (1) the tools can break, (2) the sharp edge 269 of one or more of the revolving tools merely scrapes over the end face of the log so that the log is stopped by such tool, and (3) the sharp edges of all of the revolving tools indent the butt end of the log so that all of the tools are swung outwardly by the resultant reaction until the tips of the tools reach the peripheral surface of the log. In spite of the fact that the tool arms are almost perpendicular to the axis of rotation of the hollow head they function as mentioned under (3) above, that is, the tools open automatically in less than 1/10 of a second, even when the maximum-sized log is fed to an empty rotor with butt end first.

The elastic force transmitted to the blunt edge 265 is regulated by adjusting the tension of the straps to fall within a range where the blunt edge 265 penetrates the bark but not the wood surface. Due to the high linear speed of the tool tip over the surface of the wood, this range or latitude is comparatively large so that considerable differences in barking conditions may occur without impairing a good debarking action. For example, it is possible to pass different kinds of wood such as pine, birch, spruce, even mixed logs of these different kinds, through the rotor without it being necessary to change the setting or tension of the rubber straps. The high linear speed of the tool tips also makes it possible to employ comparatively sharp edges, resulting in an almost complete removal of inner bark and cambium without scraping the wood. Thus, the radius of curvature on the blunt edge has even been brought down to a size of 1/48 of an inch in a debarking operation intended to remove bast remaining on wood that has been floated. Generally, fine debarking is effected with a tool-tip having a radius of curvature between 1/24 and 1/12 of an inch.

The width of the blunt edge is also of importance. Generally it should be kept rather narrow to provide proper debarking around knots and concavities. The blunt edge should have a width between one-tenth and one-twentieth the maximum log diameter, and the width preferably should fall within a range of 5/8" to 2", the 5/8" width being for a machine designed for 8" maximum-diameter logs that are frozen, and the 2" width for a machine designed to work on 26" maximum-diameter logs that have been floated.

The direction of the triangular deflecting surface is such that it is almost perpendicular to the surface of the smallest log, which means that a prolongation of this deflecting surface when the tool is in its innermost position passes near or through the axis of rotation of the rotor. When the tool tip is riding on a cylindrical log of maximum diameter for which the machine is intended, the angle between the deflecting surface and a plane tangential to the wood surface where the tip touches the wood will be about 65°. That part of the deflecting surface close to the blunt edge 265 will produce a tangential force against the edge thickness of the bark upon relative rotation of the rotor and the log, such tangential force being large enough to cause a rupture in the cambium zone due to a resulting shear stress. The debarking action of the tool can be termed "shear barking."

A less complicated way to describe the action of the tool is to say that the blunt edge 265 removes the bark by a scraping action. Due to the magnitude of the angle between that portion of the deflecting surface close to the blunt edge and a plane tangential to the wood surface, which angle is approximately 60°–90°, the tangential forces exerted by the tool on the edge thickness of the bark have only a small component acting to lift the tool tips. When the tool tip is in its innermost position the direction in which the rubber straps exert their forces is roughly perpendicular to a line between the center of the tool shaft 232 and the center of the pin 243 around which the rubber straps are laid. When the tool tip moves outwardly the tension of the rubber straps increases, but the effect of the increase is offset to the extent the effective lever-arm length, that is, the perpendicular distance from the tool shaft to the center line of action of the rubber bands, decreases. By varying the number of rubber bands 242 and the quality and elongation characteristics thereof, the centripetal torque exerted by the rubber bands on the tool shafts, which torque increases as the tools move to their outermost positions and stretch the rubber bands, can be made to compensate for a simultaneous increase in centrifugal torque caused by such repositioning of the tools; and thus it becomes possible to obtain any desired torque characteristic, for example, one in which the tool pressure is the same on a small log as on a large log. Due to the fact that the linear speed of a blunt edge over a wood surface, and hence the centrifugal force exerted on the tool, is directly proportional to the radius of the log on which the tip slides, it is preferable to provide a torque characteristic that, after such centrifugal force has been deducted, provides a 25 to 50% rise in the net centripetal force exerted by each tool tip. The large forces exerted axially and radially on the tool shaft result in minimum friction and wear, because of the afore-described carefully sealed roller bearings. The distance from the longitudinal axis of the pin 243 on the lever 238 to the axis of the tool shaft 232 is roughly 1/3 of the radial distance between the axis of the tool shaft and the tip 265 of the tool. In a machine having the characteristics above-described, the amount of rubber in the straps should be such that its cross section for each tool should lie in the range of 1.5 to 6 square inches per inch of the width of the blunt edge, that is, the extent of the blunt edge axially of the machine.

On the side of the rotor 209 that faces an oncoming log there are provided a number of fan blades or vanes 270, one for each tool. In a preferred arrangement these blades each comprise a strip of spring steel. This strip is provided with a loop through which is passed a hold-down bushing 271 secured by a screw 272 to the infeed face of the rotor 209. The strip is bent around the protruding portion of the bushing 233 that is on the infeed side of the rotor, as shown in Figures 9 and 10, the strip then extending in a radial direction to terminate in the neighborhood of the inner ring 140 that closes the inner periphery of that part of the annular frame that constitutes the bark-collecting and ejecting hood. Since the vanes or blades 270 are of spring steel they are resilient and yield if, for example, a large chunk of wood or a piece of metal—if a tool breaks—becomes engaged between a fan blade and the sharp corner of the ejection spout. The space in the hollow frame in which the debarking tools rotate has a diameter that is approximately the same as the outside diameter of the tool-carrying-head assembly. The infeed side of the bark-collecting and removing space is closed by a sheet-metal ring 273, the opening in the center of which can be somewhat larger than the opening in the rotor 209, if desired, so that the largest log for which the machine is intended can readily be accommodated. The outside diameter of the sheet-metal ring 273 is larger than the inside diameter of the ring 108, and is somewhat larger than what could be accommodated between the collars 105 that surround the thick-walled tubes 110, 112 and 114. The outer periphery of the sheet-metal ring 273 is cut away at three places to provide three concave cut-outs spaced 120° from one another, so that the ring can be fitted over the protruding portions of the collars 105. At such portions of the collars 105, notches 275 are cut into the contacting surfaces of the collars and the ring 108. The gap of these slots is somewhat smaller than the thickness of the ring 273. To one side of each of the three cut-outs the material of the ring 273 is relieved so as to provide a wedge commencing at one edge of the cut-out and extending some distance along the periphery of the ring. When the ring has been fitted over the protruding portions of the collars and is turned, the wedge-forming portions slide into the slots 275 until the ring 273 is tightened in place. The direction in which the metal ring 273 is turned to engage the slots is the same direction in which the rotor rotates. With this arrangement the friction of the bark on the inside face of the cover ring 273 has a tendency to tighten rather than loosen the ring. At the inner periphery of the cover ring the metal is bent forwardly, as shown in Figure 10, in order to make the cover ring more rigid and to better collect bark.

Due to the high linear speed of the debarking tools over the surface of the wood, and particularly since the tools are continuously maintained in contact with the wood surface, most types of bark are immediately torn to small pieces and thrown into the bark-collecting space in a direction that is substantially tangential to the wood surface. The bark-collecting space, as stated, is formed by the inner periphery of the ring of the sheet-metal strip structure 140 of the annular frame, the infeed face of the rotor 209, and the cover plate 273. The bark between the fan blades 270 is thrown out of the collecting space and through the tangential outlet as the fan blades sweep across the outlet. Where the upper side 139 of the tangential ejection spout meets the hood formed by the strip member 140 there is mounted a replaceable steel cutter 276, Figure 4. This cutter is so dimensioned that there is a small clearance between it and the fan blades, and cooperates therewith in cutting larger chunks of bark. With some types of bark, however, the rotational speed is not high enough to prevent the formation of long slivers of bark. Some of these slivers become caught on the concave edge of the debarking tool and impair the action thereof by adding so much weight to the same that the debarking pressure at the tips of the tool is radically decreased due to centrifugal forces exerted by the slivers of bark. To avoid difficulties of this character to a considerable degree, and as disclosed in prior application, Serial Number 517,832, filed June 24, 1955, one or more counter-steels or knife-forming members can be mounted on the interior of the sheet metal ring 273. Such knife-forming member is of rectangular section and made from a sturdy steel rod. It is mounted to extend in an approximate radial direction relative to the axis of the rotor and extends from a point close to the inner periphery of the opening in the cover ring a distance sufficient to form a sturdy counterknife but not so long as to be in the path of the vanes which, as shown, are wider at their tips than at their bases. The dimensions of the counterknife are such that a comparatively small clearance space exists between it and the infeed face of the debarking tools, that is, the plane perpendicular to the axis of the rotor which contains the protruding sharp edges of the debarking tools. This clearance space should be less than ½" and preferably about ⅛". When the tools are working on a medium-sized log a portion of the sharp edge of each tool will pass the countersteel. If there is a bark sliver on this portion of the concave sharp edge it will be cut or torn off between the countersteel and the sharp edge of the tool. Thus, the sharp edge of the tool has two completely different tasks: (1) it engages the butt end of a log being fed to automatically open and place the tool tip on the surface of the bark of the fed log against the continuously operating resilient torque applied to the tool shaft, and (2) to cut bark slivers, either by moving at a high linear speed across the ends of logs of such end diameter that the butt end forces bark slivers that are hanging around the tools to be pressed against the concave edge of the tool with such pressure that the slivers are cut immediately, as during the automatic opening of the tools, or by cooperation with a fixed counterknife, as described.

When tools are working continuously on logs, the diameters of which are small relative to the maximum-size log for which the machine is intended, a considerable amount of slivers can accumulate around the concave edge without their coming within the sphere of operation of the fixed counterknife. Therefore, it is advantageous to provide a movable counterknife that extends close to the surface of the log being debarked, independently of its diameter. As disclosed in our application Serial Number 621,788, filed November 13, 1956, entitled, "An Arrangement for Disintegrating Slivers of Bark in Debarking Machines of the So Called Hollow Head Type," the basic concept of this arrangement is that the log being debarked governs the position of the movable counterknife. Such a counterknife is preferably pivoted about a point near the inner periphery of the sheet metal strip means 140 that forms the bark collecting hood, and the knife swings in a path perpendicular to the axis of rotation of the hollow head and close to the plane containing the sharp concave edges of the tools. The movable counterknife is attached to a short shaft that extends parallel to the axis of rotation and is journaled in a tube extending through the detachable sheet-metal ring 273 that encloses the bark-collecting space. The pivotal motion and length of this tool is such that it can pass from near the axis of rotation of the head until it swings beyond the hole in the closure ring 273. The direction of the counterknife or tool is such that its free end points in the same direction as the rotational movement of the rotor. With this arrangement there is little risk of damage should a debarking tool engage the movable counterknife. This engagement would produce a force that causes the counterknife to move outwardly.

The position of a movable or pivoted counterknife can be automatically governed by the position of the three linked-together feed rolls mounted on the infeed side of the machine. These rolls, the structure and operation of which will be described more in detail hereinafter, are pivoted about axes parallel to the axis of the rotor and the degree of pivotal motion is a function of the cross section of the log engaged by the rolls. A lever can be attached to the front end of the shaft on which the pivoted countersteel is journaled and linked by a wire to a lever on the hub of one of the pivotal feed-roll arms, in an arrangement such that the pivoted countersteel is always a short distance outside the periphery of a log on which the feed rolls are working. In operation, when a big log is followed by a smaller log or no log at all, so that the feed rolls move toward the axis of the rotor, the wire becomes slack and the countersteel falls inwardly on the surface of the big log for that short period of time, generally less than ½ a second, required for the end of the big log to travel a distance from its point of engagement with the three feed rolls past the debarking tools. Alternatively, a rigid link can be utilized instead of a wire, this link incorporating a longitudinal spring and telescopic means to take care of situations when a large log is followed by a smaller log. When a smaller log is followed by a larger log, the countersteel is lifted away from the surface of the smaller log for that short period of time required for the end of such a small log to travel from just after it loses contact with the feed rolls until it passes between the debarking tools. In instances where the bark is such that long slivers thereof seldom occur, the arrangement can be such that the pivoted countersteel can be operated by a hand lever. In such instances the normal position of the countersteel would be outside the path of the largest log for which the machine is intended.

Feed works

The feed works for the debarking machine comprise a triangulated arrangement of spiked rolls which, as clearly shown in Figures 1 to 3, comprise three spiked rolls 300 on the infeed side and a similar arrangement of spiked rolls on the outfeed side. Each spiked roll is journaled for rotation about an axis parallel to the infeed and outfeed sides of the frame. Each roll is located at the end of a feed arm 301, the longitudinal axes of which intersect to form the sides of an approximate equilateral triangle. Each feed arm 301 is fastened to a flange 302 (see Fig. 15) formed on a hollow hub 304, the arms being fastened by four screws 305 having countersunk heads, the screws engaging in the flange 302. The hubs 304 are journaled in pairs, one of each pair being on the infeed side and the other on the outfeed side of each of the three smoothly bored tubes 110, 112 and 114 that are welded in place in the annular frame. On the exterior of the hollow hub 304 are mounted two sturdy tapered roller-bearing means 306, the bearing means being separated from each other by a spacer sleeve 303 that is fastened within the thick-walled tube 110. The roller-bearing means are pressed toward one another by a nut 307 engaged on an external thread on the end of the hub 304 that is within the annular frame. The nut is fixed by a suitable lock-washer construction. Both bearing means 306 are provided with seals in the shape of thin sheet-metal rings clamped against the inner races of each bearing and resiliently bearing against the faces of the outer rings and the end faces of the spacer sleeve 303, respectively. Within the feed-arm end of the hollow hub 304 is journaled a pinion 308 for a bevel-gear arrangement. The pinion shaft is journaled by spaced tapered roller bearings 309 separated from one another by a spacer sleeve 310 that is fixed within the hub by a set screw 311. The pinion-end bearing 309 has its inner ring bearing against a shoulder on the pinion and axial force is applied to the bearings by a nut and lock-washer assembly 312 threaded on an externally threaded portion of the pinion shaft. Between the inner race of the opposite bearing 309 and the nut and lock-washer assembly 312 is a ground ring 313 against which a lip-shaped rubber seal bears. A crown gear 314 for the bevel-gear transmission is located within the enlarged portion of each feed arm 301. Along the center line of each arm extends a sturdy shaft 315 on which the crown gear 314 is fixed by a splined connection and a locking pin 316. In the opposite ends of the feed arm there are seats 317 and 318 for tapered roller-bearing means 319 and 320, respectively. These roller bearings are fastened against the seats 317 and 318, respectively, by nut and lock-washer assemblies 321 and 322, the shaft 315 being externally threaded to accommodate these assemblies. Due to the fact that the nut and lock-washer assemblies are utilized, the shaft can be displaced longitudinally so as to vary or provide an increased clearance in the bevel-gear arrangement.

Each feed arm also contains an oil bath for lubricating the bevel gear, and for that reason it is very carefully sealed. In the bore of the feed arm at the end adjacent the feed roll is pressed in a ring-shaped cover 323. Between the outer periphery of this cover and the interior surface of the bore of the arm 301 is mounted a static O-ring seal 324. A ring of felt 325 is arranged on the inside of the cover to prevent large particles, such as chunks of bar, penetrating to a lip-shaped rubber seal 326 mounted between the interior of the cover and the exterior of the shaft 315. The bearing at the opposite end of the feed-roll shaft 315 is closed by a cover plug 327 sealed in place by a static O ring 328. The seal for the oil bath in the feed arm is completed by the lip-shaped seal means at the nut and lock-washer assembly 312 of the pinion shaft.

The feed roll per se is constructed of inner and outer end walls 329 and 330, the inner wall being splined to an intermediate portion of the shaft 315 adjacent the end of the feed arm 301, while the opposite end wall is splined to the free end of the shaft 315. Between the end walls is fastened a cylindrical drum 331 provided with external spikes 332. As shown in Figure 15, a tubular bore of the end wall 329 bears against a shoulder 333 on the shaft 315, and the outer end wall 330 can be displaced by means of a screw 334 threaded in a hole extending inwardly from the end of the shaft. This screw moves a thrust member 335 against a shoulder 336 formed in the bore of the outer end wall 330. Thus, when the screw is tightened in the threaded hole in shaft 315 the thrust member moves the end wall 330 toward end wall 329 to clamp and lock the drum 331 in place. The connection between the two end walls and the drum is by way of intermediate rings of rubber 337. This type of joint eliminates the necessity of careful machining, and, further, any shock stresses on the rolls as transmitted to the feed arm and frame are softened or lessened.

The spiked rolls can be manufactured in different ways. One efficient method is to cast the cylinder and spikes in one piece from steel or an abrasive-resistant cast iron. Such rolls, however, are comparatively heavy, which would be a detriment in a portable debarking machine. It is preferred to manufacture the rolls by screwing in or welding surface-hardened conical spikes to cylinders cut from steel tubing. For the rolls on the infeed side of the machine it is important that the surface of the spikes be smooth and the top angle of the conical spikes be neither too small nor too large. This angle should preferably lie in the range of 55 to 65°. The axial and circumferential pitch of the spikes should likewise not be too small. The circumferential pitch should preferably lie in the range of 10 to 20°. The height of the spikes should be in the range of ½" to 1½", depending on the size of the machine. By choosing spikes having sufficient smoothness, and having pitch and conic angles in the ranges stated it is possible to completely avoid formation of bark slivers, which would tend to wind up on the rolls. Therefore, the provision of external tooth-clearing means such as rakes carried by the feed arms, can be eliminated.

The rolls generally wear the most near the free ends. Since the rolls are symmetrical and cylindrical, it is a simple matter to detach the rolls and remount them by reversing the drum so that the less-worn part is near the free end, thereby practically doubling the service life of each roll.

In each feed-roll-arm unit there is a cylindrical part 338 attached to the back side of the flange 302 by means of the four screws 305. To further insure that there is no relative rotational movement between the arm 301, the flange 302 and the cylindrical part 338, these parts are locked by cylindrical pins 339. The cylindrical part 338 is mounted so as to have a rather small clearance with the adjacent face of the collars 105, in order to prevent chunks and particles of bark coming in contact with the seals for the bearings 306 adjacent the feed-arm unit. The cylindrical part or member 338 is further provided with bell cranks 340 that are angularly spaced 120° and that have arms projecting somewhat outside the outer periphery of the annular frame. At the tips of the arms of these bell cranks 340 are journalling means for links 341 that connect each arm unit with the other two units in such a way that all three feed arms simultaneously pivot the same distance in the same direction. These links 341 are steel strips and at each end each link is forked. Disposed within the fork is a hardened and ground steel cylinder 342 clamped by a screw 343. The ground outer surface of this cylinder serves as the inner race for needle bearing 344 housed in a bore in each arm tip of each bell crank 340. This connection between links and levers is sturdy, has low friction, and thus does not have to be greased more than a few times a year. Near their opposite ends the links are curved, as shown in Figure 1. This curvature permits such a pivotal motion of the three arms that the rolls and arms can be swung outwardly to be completely outside of a diameter somewhat larger than the outer diameter of the tool-carrying-head assembly and the sheet-metal ring 273 that encloses the bark-collecting space, so as to make it possible to remove these elements from the machine and attain access to the parts within the machine without it being necessary to disassemble the feed works and without the necessity of employing levers that extend far outside the outer periphery of the annular frame.

In addition to synchronizing the pivotal motion of the three feed arms and feed rollers, the three links of each set also function to transmit an elastic actuating force that is introduced into the feed-works system by spring means acting on a lever 340' formed on the bell crank 340 of the top feed-roller-arm unit. This spring embodies means for controlling the inward speed of the rolls when they have left the end of a large log, and means for stopping the inward movement of the rolls at point that is selected with respect to the minimum log diameter for which the machine is intended.

Each feed-roll arm, its associated spiked roll, the journaling means for the same, the bevel gears and their journaling means, the journaling means for the pivoting action, the sealing and oil-bath arrangement, the bell cranks and journaling means for the synchronizing links form a distinct unit that is separately assembled. It is easy to connect this unit to the machine and to remove such a unit for inspection or replacement of parts.

The inside of all three of the thick-walled tubes 110, 112 and 114 that are welded in the hollow annular frame are provided with a straight and smooth bore extending parallel to the axis of the rotor. Within these tubes the exterior of each spacer sleeve 303 for the roller bearings which pivot the feed arm is closely fitted and the sleeve is fastened in place by setscrews that are passed through openings 345 in the annular frame. Thus, inserting or removing a complete feed-arm unit is a simple task. That end of the pinion shaft remote from the pinion 308 is splined as shown at 348. When two feed-arm units are inserted within the opposite ends of one of the thick-walled tubes the splined end of the pinion shafts face each other. These ends are connected by a tube 346 within the opposite ends of which are rigidly fastened two internally splined sleeves 347. These sleeves 347 mesh with the splines 348 on the ends of the pinion shafts. Fastened to the central portion of the tube 346 is a sprocket 349, the outside diameter of which is somewhat smaller than the internal diameter of the respective thick-walled tube, so that the assembly of sprocket, connecting tube and female splined sleeve can be introduced through the thick-walled tube. The sprocket is maintained in the same plane as the slot 116 in the thick-walled tube and is kept in place by a rubber sleeve 350 mounted between the end of the tube 346 and the nut 312 on the pinion shaft. The afore-described splined connection provides for ready assembly (and disassembly) of each of said arm units on (and from) the end of the corresponding thick-walled tube.

In mounting the drive for the feed rolls a double chain, shown diagrammatically at 126, is fed through the spaces 118 between the sheet-metal rings 104 and 106 and passed over each one of the three sprockets 349. Likewise mounted in the space between the above-mentioned ring members of the frame are two smaller double sprockets 351 secured in position, as shown in Figure 6, by an externally threaded screw which passes through a bushing arrangement for the sprockets and which bushing arrangement supports a ball-bearing means and is so mounted as to keep the chain from running in contact with the faces of the rings 104 and 106. There is an additional sprocket 352 rotatably mounted at the free end of a forked lever 353 that has its inner end pivoted on a suitable support fastened to the rings 104 and 106. This forked member has a lug 354 extending laterally thereof in the path of movement of a setscrew 355 which can be moved inwardly to pivot the fork, and thus the sprocket 352, to tighten the chain 126. The chain is driven by the driven sprocket 128 carried by the shaft 130, as shown in Figure 7. On the end of the shaft facing an oncoming log is a flange to which is screwed the driven sheave 132.

When this sheave is rotated by a V-belt arrangement the three sprockets mounted in the tubes 110, 112 and 114 are likewise driven, resulting in a drive on each of pinions 308 and the turning of the crown gears 314 to rotate the shafts 315, and the feed rolls on both sides of the debarking machine will rotate in the same direction because the three crown wheels 314 on one side of the machine are mounted as shown in Figure 15, and the three crown wheels on the other side of the debarking machine are reversed and mounted, as shown diagrammatically in dotted lines at 314' in Figure 15. As previously indicated, there is a synthetic-rubber band 113 closing the outer periphery of the annular space 118 so that the chain drive is sealed within that space. The bottom of this sealed space 118 constitutes a sump for an oil bath through which the chain passes, thus insuring proper lubrication of the chain, and by means of oil carried and splashed by the chain, proper lubrication of all the unsealed ball bearings in the space 118 that journal the sprockets. As previously indicated, some of the oil carried by the chain enters through the slot 116 in the top thick-walled tube 110 to effect continuous lubrication of the large ball-bearing arrangement embodied between the rotor and stator of the tool-carrying-head assembly. When a log is fed or pushed against the feed rolls of the infeed side the spikes of the rolls engage the same and the energy transmitted by the chain to the feed rolls is, for a short moment, utilized to overcome the resilient force applied by the spring means acting on the lever 340' on the top feed-arm arrangement on the infeed side. The rolls move away from the center of the log and at the same time begin to feed the same forward. The swift outward movement of the feed rolls is terminated when the rolls begin to travel on the exterior of the log. The log is then forced against the tools carried by the rotor, which automatically open in a fraction of a second to place themselves in debarking position. The action of the tools on the log is such as to tend to rotate the log in the same direction as the rotor. The feed-roll units are mounted so that the free end of the arm points in a direction opposite to that of the rotation of the rotor. The tendency of the log to turn will initiate forces acting on the rolls at their areas of contact with the log. These forces act in directions parallel to the axes of rotation of the feed rolls and toward their inner end walls 329. It is therefore clear that these forces will generate a torque that causes the linked together feed rolls to be pressed against the log. This torque results in a pressure which is super-imposed on the resilient pressure exerted by the spring means at the top of the feed-roll arrangement. To a large degree the pressure of the feed rolls instantly follows the turning tendency of the log. The feed works are therefore, to a large extent, self-regulating, which means that the actuating pressure exerted by the spring means can be maintained at a comparatively small value since this actuating pressure is the initial pressure that has to be overcome when the rolls climb the ends of a log. Since this is at a small value the climbing or opening action of the rolls is facilitated and the entire debarking machine is completely automatic in operation without it being necessary to make the diameter of the rolls too large. The feed-roll diameter can be thus maintained in the range of 70 to 100% of the maximum log diameter for which the machine is intended.

The angle of swing of the feed-roll arms from their innermost to their outermost positions should preferably be in the range of 20 to 35° and the length of each feed roll axially of the arms should be approximately equal to ½ the diameter of the maximum log to be debarked by the particular machine.

Due to the mounting and structural arrangement of the three spiked, pivotally mounted and synchronized feed rolls, they have an unusually efficient holding, centering and feeding capability with respect to logs having an unusually high ratio of varying diameters. Thus, a feedworks arrangement for a machine intended to be used to debark logs of 14" maximum diameter will properly hold and feed logs of a diameter down to slightly less than 1". Another factor that is of importance is the fact that the larger the log diameter, and thus the heavier the log, the further from the free end of the feed roll is that area of contact between the periphery of the log and the feed roll. This imposes less mechanical stresses on the feed arms than a stress which would directly correspond to the weight of the log.

The feed rolls on the outfeed side of the frame open in the same fashion as the feed rolls on the infeed side. However, when a large log is fed butt end first the same is retarded slight by the feed rolls on the outfeed side before they open. This causes the rolls on the front or infeed side to slide and produces a sudden load increase on the transmission system. This load increase occasioned by a large log encountering the feed rolls on the outfeed side is substantially decreased because the pinion-contacting teeth, on the crown wheels (planetarius) of the bevel-gear drives of the feed rolls on either the infeed or the outfeed side, revolve counterclockwise (as viewed from the infeed side of the machine) around the axes of the pinion (sun-gear) shafts during counterclockwise opening movement of each feed-roll arm 315 about the axis of its pinion 308 and, if the pinions remained stationary, would cause the crown gears to rotate clockwise (as viewed from the free end of each feed-roll arm) so as to backfeed the log. However, since all pinion and feed-arm shafts are rotating counterclockwise (as viewed, respectively, from the infeed side of the machine and the free end of each feed-roll arm) about their own axes while feeding a log through the machine, such backfeed never occurs, but instead, the spreading of the feed-roll arms merely reduces the log-feeding speed of the rollers. Thus, as a log spreads the feed rolls on the outfeed side, it simultaneously reduces their surface speeds and hence reduces their angular moments and the torque required to change the directions of their spinning axes, all of which correspondingly reduce said load increase on the transmission system.

Additionally, when the large end of a big log leaves the feed works on the outfeed side the inward pivotal motion of the arms will cause an increase in the rotational speed and angular momentum of each of the rolls 300, thus increasing the gyroscopic effect of the spinning rolls and hence the torque required to change the directions of their spinning axes, which retards their inward swinging movement induced by the spring means 356, and thus results in a closing operation more quiet than if the rolls continued to operate at their log-feeding speeds.

The distance between the center lines of the feed rolls on the front and the center lines of the feed rolls on the back or outfeed side is at a minimum value, lying in the range of one and one-half to two and one-half times the diameter of the largest log for which the machine is intended. In other words, the extent of the machine axially of a log is maintained at a minimum. This factor, coupled with the efficiency of the triangulated feed works, the extremely light-weight tools, and the high rotational speed of the rotor, accounts for an unusually quiet operation. Due to the short axial distance between the infeed feed rolls and the tools the debarking machine can be utilized without further sets of damping rolls on the infeed and outfeed sides of the machine. A machine for 14" logs, therefore, can be used to debark logs having a length down to 3' without any damping rolls, although some damping means are recommended for consistent debarking of logs shorter than 6' in length.

The resilient force that urges the three feed rolls on each feed works toward the axis of rotation of the rotor is generated by spring means carried on the top of the debarking machine. These spring means are constituted by at least one rubber spring 356, one spring for each feed works being illustrated in Figure 21, while a double spring for each feed works is shown in Figures 2, 3 and 17. One end of each spring 356 is attached to a bracket 357 mounted on the base C that supports the annular frame. The other end of each spring assembly is pivotally connected to the lever 340' extending upwardly from the cylindrical member 338 that is embodied with the top feed arm of each feedworks assembly. The resilient force transmitted by the spring assembly is distributed to the other two feed arms in each feed works by the synchronizing links 341. In addition to the rubber spring, the spring assembly also includes a hydraulic damping means, a rubber cushion, means for regulating the spring force, and means for stopping the motion of the feed rolls toward the axis of the rotor in a position determined by the desired minimum log diameter. Each spring assembly is readily detachable for servicing. However, the greatest importance of this ease of detachability is the fact that it enables the feed-roll arms to be swung outwards so as to expose the infeed and outfeed sides of the tool-carrying-head assembly. The mounting of the parts is such that an unskilled laborer can expose the interior of the debarker in less than two minutes. The spring force of the spring assembly is generated by a thick-walled rubber tube 359 bonded at its ends to wedge-like extensions of two circular and apertured metal end members 360 and 361. Due to the formation of the wedges on the facing surface of each of these metal end members, the bond between the rubber tube 359 and the metal members will mainly be exposed to shear stresses when the spring assembly is under tension. The metal end member 361 is a ring having an internal diameter the same as the internal diameter of the tube 359. This ring is interiorly threaded and threadedly engaged within the ring is a cylindrical end plate 362, in the center of which is a small internally threaded hole by means of which the spring assembly is attached to the bracket 357 by a sturdy screw 363. Bonded to the interior of the end plate 362 by a conical-shaped rubber cushion is an internally threaded cup-shaped member 364 which receives the externally threaded end of a hydraulic cylinder 365. In the center of the cup-shaped member is a screw plug 366 that is accessible through the threaded aperture in the end plate 362, a hole being provided in the rubber cushion. On the exterior of the cylinder 365 are provided two flanges 367, one at each end of the cylinder. Concentrically about the cylinder for almost its entire length is a rubber tube 368. The flanges are somewhat concave on the exterior and the ends of the tube are clamped to these flanges by winding and tightening a wire 369 about each end portion of the tube to clamp the same against the respective flanges. The annular space 370 between the inner periphery of the tube 368 and the exterior of the cylinder 365 is in communication with the interior of the cylinder through suitable bleed holes 371. Concentric with the longitudinal axis of the spring assembly is a long steel rod 372. The outer and free end of this rod is enlarged and bored to provide a seat for a needle bearing 373. The inner race of this bearing is a ground cylindrical member supported by a pin 374. The pin has a central section that is rectangular in cross section and enlarged. A washer means 375 closes one end of the bearing and another washer 376 closes the other end of the bearing, the latter washer being held in place by a bolt 377 threaded within an aperture in the end of the pin. The needle-bearing arrangement is to take care of the pivotal and rotational movement of the pin 374 which is attached to the lever 340' of the cylindrical part 338 on the uppermost of the feed-arm assemblies 301 by means of a rectangular slot extending radially inwards from the end of the lever 340'. The rectangular section of the pin is guided into the slot, the fastening being effected by the clamping action of the two bolts 377.

Where only one spring assembly is embodied for each feed works a nut and washer assembly is mounted on a headed pin so that a rectangular section thereof is firmly held in the slot in the lever 340' upon tightening a nut corresponding in function to one of the bolts 377. A considerable portion of the length of the rod 372 is externally threaded as at 378. Threadedly engaged on this threaded portion is the end member 360 of the spring. By turning the large rubber tube 359 and the members bonded to it with relation to the steel rod 372, the end plate 360 is moved along the threaded portion 378 and away from the end ring 361. By this turning movement the thick-walled rubber tube can be stretched to provide a desired elastic force, the characteristics of which are effected by the quality of the rubber, the cross-sectional area, and the length of the tube. When stretched, the tube contracts to provide a more or less hour-glass shape to the tube assembly.

When the feed rolls move outward to climb a log a certain amount of energy is stored in the spring. This energy is released when the end of the log leaves the feed works and there is no immediately following log. The release of the energy in this fashion could initiate shocks in the machine unless damping means are provided. The damping of the spring assembly or assemblies for each feed works is accomplished hydraulically. The end portion of the long steel rod is ground to form a plunger 379. This plunger fits within the cylinder 365 within the inner rubber tube 368. The open end of the cylinder includes a dirt-removing ring and an O-ring seal. When there is no log in the feed works the end of the steel rod, the plunger portion, engages against the cup member 364 that forms the bottom of the cylinder. The minimum gap between the feed rolls, can be adjusted by placing spacers as at 380 between the end plate 362 and the bracket 357 before tightening the holding screw 363.

Before the spring assembly is attached to the machine, oil is poured into the cylinder. The screw plug 366 is removed and the oil is passed into the cylinder and the annular space 370. During this filling operation the spring assembly is held vertically and the plunger is pulled outwards in the cylinder to the same position it will reach when the maximum diameter log goes through the feed works. In this fashion the correct amount of oil is introduced into the system without the risk of forming air pockets. When the plug 366 is reinserted and tightened the plunger is drawn to the bottom of the cylinder, the end having the cup 364 thereon, due to the action of the thick-walled rubber tube, and the oil is pressed into the annular space 370 through the holes 371 in the walls of the cylinder. The end portion of the plunger 379 is slightly tapered so that as it moves toward the bottom of the cylinder and its terminal end passes the last bleed hole in the wall of the cylinder, the oil must flow up the tapered end part of the plunger to reach the bleed hole. This provides a progressively stronger damping action. When the log enters the feed works and the plunger moves outwardly from the inner end of the cylinder, the oil in the annular space is pressed through the bleed holes back into the cylinder by the tension in the rubber tube 368, the outside of this tube being subject to air pressure and the inside, to suction generated by the fast withdrawal of the plunger. While it might be possilble that this suction could form a vacuum in the cylinder, the small cross-sectional area of the plunger is such that there will be no strong retarding force. When a log leaves the feed works and the end of the plunger moves toward the bottom of the cylinder the final shock is absorbed by the rubber cushion between the cup-shaped end plate 364 and the end plate 362. This rubber cushion serves as a flexible connection between the end plate and the cylinder, since the end plate 362 is screwed to the bracket and the cylinder has a pivotal motion due to the fact that the steel rod 372 oscillates in a sectorial path generated by the pivotal motion of the top feed arm. The threaded portion of the steel rod is protected by a rubber sleeve 381.

It is clear, therefore, that the spring assembly is a compact and efficient component. By disposing the rubber tension tube about the damping and stopping mechanisms the latter are effectively protected from dirt. Other important features of this spring assembly are: it defines a minimum gap between the feed rolls, the spring pressure can be easily regulated, and the spring remains under tension after the plunger 379 has reached its innermost position within the assembly so that the entire spring assembly can be removed without it being necessary to release the tension of the spring.

The spring factor is preferably in the range of 300 to 600 pounds per inch. By a tandem or double arrangement, as shown in Figure 17, it is possible to use substantially the same spring unit on machines intended for 8" maximum-diameter logs, as well as on those for up to 26" maximum-diameter logs.

The main elements described in the foregoing, that is, the annular hollow frame, the tool-carrying-head assembly including the rotor and stator constructions, and the feed works and associated spring assemblies, are substantially the same, regardless of whether the debarking machine is to be used for stationary applications or is to be mounted on a mobile frame such as a tractor, truck or the like.

When the debarking machine is intended for stationary use, the annular frame is fastened to an asymmetrical base C. This base is on the right when the debarking machine is viewed from the infeed side. The base is a hollow welded frame that has the same width axially of a log as the hollow annular frame A. The base includes a bottom portion which is bolted to a suitable foundation on the ground. Additionally, the base further has an aperture therein that forms a continuation of the tangential bark-ejection outlet channel in the annular hollow frame. The portion of the base that faces the annular frame is concave with the concavity being concentric with the annular frame and following this annular frame for almost 180°. The base includes circumferentially spaced crossbeams 382 which have radially disposed, internally threaded openings therein along their length to accommodate fastening screws, not shown, that are screwed into threaded openings in the annular frame. The heads of the screws rest against the crossbeams and metallic contact between the crossbeams and the exterior of the annular frame is reduced by inserting rubber pads, not shown, between the annular frame and the base in the neighborhood of the fastening screws. Opposite to the concave portion of the base the boundary thereof is a sloping straight surface which at its upper end is bent around an arc of a circle to then become a straight sloping surface extending down to the periphery of the annular frame. The base thus forms a head that projects rearwardly and upwards. The base includes, therefore, infeed-side and outfeed-side plates 383 and 384 and an end wall 385 that is welded to these plates to space the same a distance approximating the axial extent of the annular hollow frame. Flanged to the outfeed side of the plate 384 is an electric motor M, the shaft 386 of which passes through an enlarged aperture in the plate 384. On this shaft are two V-belt driving sheaves, one 387 transmitting power by its associated belt 133 to the rotor 209, and a smaller V-belt sheave 388 on the outer end of the shaft transmitting power to the feed-works drive. The tension of the belt 133 passing over sheaves 387 is adjusted by moving the flanged motor toward or away from the axis of rotation of the rotor 209 by means of an adjusting screw 389 (see Figure 18). A seat for the head of this screw is provided on the outside of the rounded portion of the end wall 385. The screw extends towards the axis of rotation of the hollow head and passes through a threaded hole formed in a flange 390 that projects from a ring member 391 on the inside of the plate 384. This ring is the same size as the flange on the motor M, and the motor flange is bolted to this ring by bolts 392, suitable slots being provided in the plate 384 to accommodate movement of the motor toward and away from the axis of rotation. When the bolts 392 are loosened the ring, and thus the motor, can be moved by turning the tension screw 389. When the desired tension in the V-belt drive is attained the bolts 392 are tightened, thereby fixing the position of the motor by clamping the same in its adjusted position. The feed-works mechanism is driven from the motor through a V-belt speed reducer comprising the V-belt sheaves 388 on the end of the motor shaft, a set of V belts 404, a double V-belt sheave having a large-diameter portion 393 and a reduced-diameter portion 394 over which is trained another set of V belts, shown diagrammatically at 396, these belts passing over the sheaves 132 mounted on the shaft 130, Figure 7. Adjustment of the tension of both sets of V belts is effected by swinging the double V-belt sheave about pivot shafts 405 and 406, the tensioning mechanism comprising a sleeve 407 that surrounds the shaft 405, two tapered rubber bushings 408 and 409 pressed against each other and the sleeve by a nut 410 and washer 411, the resulting axial force being taken up by a flange 412 on the shaft 405. By turning this shaft with a wrench on its square external head 413 torsion will build up in the tapered rubber bushings producing tension in the V belts. When the desired tension is reached the shaft 405 is locked in its position by a nut 414 and the pivot shaft 406 is locked by a clamping screw 415. Elongation in the V belts is taken up to a large degree by the tapered rubber bushings 408 and 409 without substantial decrease in belt tension. Access to the V-belt drives on the interior of the frame is attained through suitable lids, such as at 397, 397' and 398, covering upper and lower openings in the end wall 385 and an opening in the infeed-side plate 383, respectively. The lower lid 397', Figure 19, can close a space utilized to accommodate tools for servicing and adjusting the machine.

In some cases it is advantageous to be able to reverse the feed-works rolls, for example, when a log has started to enter the debarker with the small end first and it is noted that it has a trailing end too large to pass through the opening in the hollow head. To effect reversal of movement of the log it is desirous that the drive to the rotor be interrupted. To accomplish this, in instances when the machine is powered by a single motor as at M, the sheave 387 is connected to the motor shaft 386 by a one-way coupling employing two hardened-steel rings having sloping recesses accommodating rollers. When rotated in one direction the rollers engage and the V belt 133 follows the motor shaft in its rotation to transmit drive to the hollow head. When the direction of rotation of the motor is reversed the one-way coupling disengages, and power transmission to the hollow head is interrupted. However, the sheave 388 for the V belts 404 is fastened to the motor shaft 386 by key or wedge means and continues to transmit drive to the chain drive for the feed works. Thus, when the motor is reversed the feed rolls rotate reversely and back the log out of the machine. Since one-way couplings between a sheave and a shaft, are well known in the art the details of the one-way coupling are not part of this invention. However, the concept of employing such a combination with other elements of the drive for the feed works and the rotor for a debarking machine of the type described, is an improved feature of this invention.

Figure 16 is a fragmentary view disclosing an arrangement for utilizing the drive to the feed works to impart power to a log-conveying mechanism for feeding logs end-to-end to the infeed side of the feed works. In this figure, the bevel gear 314 carried by one of the hollow arms 301 is in mesh with a pinion gear 399 carried by a shaft 400 that is mounted in sealed roller-bearing units at each end of a collar 401 that is threaded within an aperture 402 that is in alignment with the pinion 308. The opposite end of the shaft 400 has a further pinion 403 which is meshed with the bevel gear of a suitable drive arrangement, not shown, for a log-conveying system. In this connection, it is to be borne in mind that the pinion 403, being a power take-off drive pinion, can be utilized to drive any type of auxiliary equipment that is to be associated with the debarking machine. Further, when the debarking machine is embodied in stationary applications there will be a log trough leading to the infeed rollers and leading away from the outfeed rollers. A conveying mechanism, such as a chain, operates in the bottom of each of these troughs to feed logs to and from the debarking machine.

Since the annular frame, the tool-carrying-head assembly of rotor and stator, and the feed-works-mounting and driving means are, in effect, units of the debarking machine, the construction and arrangement thereof readily adapt them to use in portable utilizations. In such event and as indicated in our prior-filed application, Serial No. 571,740, filed March 15, 1956, and entitled, "Log Handling Arrangement For Debarking Machines," the base or pedestal is eliminated and a sheet-metal housing embodying a transmission head is secured to the annular frame. This transmission head is similar in configuration to the upper part of the base. Within the transmission head is a shaft, the equivalent of the motor shaft 386, this shaft being journaled in roller bearings in a housing flanged to the outfeed side of the transmission head in a manner similar to the mounting of the flanged motor M. The tensioning of the V-belt drive for the rotor is effected by moving this last-mentioned flanged housing in the same manner as is the tensioning of the belt drive from the motor M. On the outfeed side of the flanged housing the immediately above-mentioned shaft has a protruding end carrying a V-belt sheave which receives power from the power take-off of a tractor or from a separate internal combustion engine mounted on a suitable mobile frame. The interconnected assembly of feed works, transmission head, annular frame, and flanged housing further includes bracket means at the base or lower end of the annular frame by which the assembly is bolted to a suitable foundation on a truck, or to a supporting frame protruding from the rear end of a tractor. The unit assembly is mounted so that the axis of the rotor is perpendicular to the line of movement of the mobile frame. Further carried by the mobile frame is a tubular framework including circular end members, one on each side of the respective feed-works rolls, and pivotally mounted mechanisms moving about an axis perpendicular to the axis of the rotor and supporting suitable log pick-up means, log-holding means, and rollers for feeding the logs to and from the debarking-head feed works. In such arrangement, the pinion shaft 400 is utilized as a drive for a double-coned spiked roller carried by the pivoting frame on the infeed side of the debarking unit, which functions to feed the logs to the feed-works rolls on the infeed side.

The particular tools disclosed in this application include the tool means of Figure 21, in which the tool 264' includes a metal body having a flange bent laterally from one end thereof. This flange 267' fits in the slot machined in the head 235 of the tool-carrying shaft. To the side of the metal body from which the flange projects is welded a triangle-shaped deflecting piece 266', this arrangement of the tool being similar to that embodied in application Serial No. 418,854. As shown in Figure 21, the face of the metal body opposite the flange has a protruding portion terminating in the sharp edge 269' that renders the tool self-opening. Figure 21 further clearly discloses the packet of Belleville spring means 258 carried on the back of the ring 253.

The tool of Figures 12 to 14 can be cast from an abrasive-resistant cast iron, or can be formed by forging. In any event, the deflecting surface 266 is integral with the crescent-shaped body portion of the tool.

Another distinction resides in the fact that the flange 267 which fits in the slot 236 in the wing-shaped head 235 on the tool-carrying shaft extends along the crescent-shaped body so that, in effect, it is substantially perpendicular to the tool tip 265, whereas in Figure 21 the flange 267' on the back side of the crescent-shaped body is approximately parallel to the tool tip or outer end of the crescent. The arrangement of Figures 12 to 14 permits the tool to be of lighter construction without sacrificing strength.

Figure 21 additionally incorporates a single tube-shaped elastomer spring 356 for each of the feed-works mechanisms.

What is claimed is:
1. A debarking machine comprising an annular hollow frame having opposite end members, one facing the direction of log feed and the other being on the outfeed side of the machine, means for supporting the annular frame, a stator mounted within the annular frame intermediate the end members, a rotor within the stator, a plurality of debarking tools, each tool having a debarking tip, means pivotally mounting the tools on the rotor for swinging movement about axes parallel to the axis of rotation of the rotor, and in paths containing a plane extending between the rotor and the interior surface of the end member of the frame that faces an oncoming log, means for normally urging the tools to swing inwardly around their axes and for continuously resiliently pressing the tips against the surface of a log being debarked with such intensity that the tips penetrate the bark and continuously ride on the wood surface of such a log despite irregularities of log contour and bark, a wood-contacting edge of each tip being blunt so as not to unduly damage the wood, infeed and oufeed mechanisms mounted on the exterior of said opposite end members of the frame and each mechanism including a triangulated arrangement of feed rolls rotating about axes lying in a common plane that is perpendicular to the axis of the rotor, means carried in part by the annular frame and in part by the means supporting the frame and operatively interconected with the rolls to normally urge the feed rolls toward the axis of rotation of the rotor so that the rolls on the infeed side center a log to be debarked with relation to the axis of the rotor, driving means for rotating the feed rolls to feed logs through the rotor so that they are debarked therein while restrained against rotation by the rolls, including drive components supported within the annular frame and by the means supporting the frame, and means for rotating the rotor.

2. A debarking machine of the type wherein logs are fed axially of their length while restrained against rotation to and through a rotary tool-carrying head, comprising the combination of a rigid annular hollow frame including axially spaced end members and a pair of intermediate members spaced axially from one another a distance less than the spacing between the respective intermediate members and end members, a stator mounted within the frame and supported by the intermediate members, said rotary tool-carrying head constituting a rotor, means journaling the rotor within the stator, a plurality of debarking tools having blunt edges, means pivotally mounting the tools on that face of the rotor facing an oncoming log, said last-named means including shafts extending through the rotor and into the space between the end member of the frame on the outfeed side and the opposite face of the rotor, said tools swinging in paths containing a plane extending between the face of the rotor that faces an oncoming log and a plane containing the interior face of that end member of the annular frame adjacent said rotor face, means operatively associated with the end of each shaft opposite to that carrying the tool for adjustably applying torque to the tool to urge the blunt edge of the tool in a direction toward the axis of the rotor to maintain the tool in contact with a log being debarked with sufficient intensity so that the blunt edge penetrates the bark and continuously rides on the wood while removing bark from such a log, three tubular members each extending through the respective members of the annular frame, connected therewith and angularly spaced 120° so that longitudinal axes of the tubular members extend parallel to the rotor axis and define the corners of an equilateral triangle having a horizontal base, each tubular member projecting beyond the respective end members of the annular frame, infeed and outfeed mechanisms carried, respectively, by opposite ends of the tubular members, and including within each of the opposite ends of each of the tubular members a pivotal hub, means journaling each hub within its respective end of the tubular member, a hollow arm carried by each hub and extending perpendicular thereto, each arm including an outer end, a feed-roll shaft mounted within the arm and projecting beyond the outer end, a feed roll carried on the projecting end of each feed-roll shaft, drivable means including a component within each tubular member for rotating the feed-roll shafts at opposite ends of each tubular member, a bell crank mounted on each of those hubs associated with the ends of the two tubular members which determine the base of said triangle, each bell crank and hub being swingable about said longitudinal axis of the respective tubular member and each bell crank being swingable in a path located between the axis of the feed-roll shaft and the associated end member of the annular frame, link means extending between adjacent lever arms of the bell cranks and connected therewith for transmitting swinging movement of one bell crank to the other, another bell crank similarly mounted on each of the two hubs associated with the uppermost tubular member and similarly linked to said one and said other bell cranks, an additional lever carried by each of said uppermost bell cranks, and adjustable force-applying means connected to the respective additional levers to resiliently apply an adjustable torque to the arms to urge the fed rolls inwardly toward the axis of rotation of the rotor whereby when an oncoming log engages the feed rolls on the infeed side of the annular frame the same are moved outwardly while being maintained in contact with such a log to center the same relative to the axis of the rotor and to feed the same through the rotor, the feed rolls on the outfeed side of the annular frame receiving the foremost end of such log as such log moves through the rotor and said outfeed rolls further centering and supporting the debarked portion of such log.

3. A debarking machine of the type wherein logs are fed axially of their length while restrained against rotation to and through a rotary tool-carrying head having pivotally mounted log-opened debarking tools thereon, comprising the combination of a rigid annular hollow frame including axially spaced end members and a pair of intermediate members spaced axially from one another a distance less than the spacing between the respective intermediate members and end members, a stator mounted within the frame and supported by the intermediate members, said rotary tool-carrying head constituting a rotor, means journaling the rotor within the stator, three tubular members each extending through the respective members of the annular frame, connected therewith and angularly spaced 120° so that longitudinal axes of the tubular members extend parallel to an axis of rotation of the rotor and define the corners of an equilateral triangle having a horizontal base, each tubular member projecting beyond the respective end members of the annular frame, infeed and outfeed mechanisms carried, respectively, by opposite ends of the tubular members, and including within each of the opposite ends of each of the tubular members a pivotal hub, means journaling each hub within its respective end of the tubular members, a hollow arm carried by each hub and extending perpendicular thereto, each arm including an outer end, a shaft mounted within the arm and projecting beyond the outer end, a feed roll carried on the projecting end of each shaft, drivable means including a component within each tubular member for rotating the shafts at opposite ends of each tubular member, a bell crank mounted on each of those hubs associated with the ends of the two tubular members which determine the base of said triangle, each bell crank and hub being swingable about said longitudinal axis of the respective tubular member and each bell crank being swingable in a path located between the axis of the feed-roll shaft and the associated end member of the annular frame, link means extending between adjacent lever arms of the bell cranks and connected therewith for transmitting swinging movement of one bell crank to the other, another bell crank similarly mounted on each of the two hubs associated with the uppermost tubular member, and similarly linked to said one and said other bell cranks, an additional lever carried by each of said uppermost bell cranks, and adjustable force-applying means connected to the respective additional levers to resiliently apply an adjustable torque to the arms to urge the feed rolls inwardly toward the axis of rotation of the rotor whereby when an oncoming log engages the feed rolls on the infeed side of the annular frame the same are moved outwardly while being maintained in contact with such a log to center the same relative to the axis of the rotor and to feed the same through the rotor, the feed rolls on the outfeed side of the annular frame similarly receiving the foremost end of such log as such log moves through the rotor and further centering and supporting the debarked portion of such log.

4. A debarking machine of the type wherein logs while restrained against rotation are fed axially to and through the machine, comprising a rigid annular hollow frame, a stator supported within the frame intermediate infeed and outfeed sides thereof, a tool-carrying rotor journaled within the stator, infeed and outfeed mechanisms supported on the infeed and outfeed sides of the frame, each mechanism including a plurality of feed rolls, means mounting the rolls for movement toward and away from the axis of the rotor including means for applying the rolls to the periphery of a log to center the same relative to the rotor, and driven components housed within the hollow frame, one of said driven components imparting rotation to said rotor, and other of said driven components including drive elements for imparting rotation to the rolls.

5. A debarking machine as claimed in claim 4, in which the annular frame includes internal surfaces defining a bark-collecting space having a tangential outlet.

6. A debarking machine as claimed in claim 5, further including drive-input components, and supporting means for the annular frame and the drive-input components, said drive-input components being operatively connected to said driven components for imparting rotation to the rolls and rotor.

7. A debarking machine as claimed in claim 6, in which the supporting means for the frame carries energizing means for applying positioning force to the feed rolls.

8. A debarking machine as claimed in claim 4, further including a single input shaft rotatable in opposite directions, a rotary component carried thereby for rotation in one direction only, means coupling said rotary component to said one driven component for rotating the rotor only in said one direction, a further rotary component carried by said input shaft, and means coupling the same to said other driven components for imparting rotation to the feed rolls in opposite directions, whereby reverse rotation of the input shaft effects reversal of the feed rolls without imparting drive to the rotor.

9. A debarking machine as claimed in claim 4, in which the rotor and stator comprise a tool-carrying-head assembly having an external diameter approximately equal to the internal diameter of the annular frame and twice the diameter of a maximum-sized log to be debarked, said annular frame having an external diameter approximately three times the diameter of a maximum-sized log to be debarked, the axial extent of said head assembly being approximately equal to the maximum log diameter, the external diameter of bearing means journaling the rotor being approximately one and one-half the maximum log diameter, a plurality of debarking tools pivotally mounted to swing about axes parallel to the axis of the rotor and carried by the rotor, each tool having a tip that travels in an arcuate path, the radial distance between the tip of each tool and the axis about which each tool swings being approximately two-thirds the maximum log diameter, the tools being constructed and arranged so that a prolongation of the path traveled by the tip passes through or closely adjacent the axis of the rotor, means for swinging the tools inwardly about said axes so as to move the tips toward the axis of the rotor, said last-named means including pins extending parallel to the rotor axis and connected one to each tool, the radial distance between a longitudinal axis of said pin and the axis about which the tool swings being one-third of said first-mentioned radial distance, said last-named means further including means for applying force to each of said pins, the center line of the force acting on each pin being approximately perpendicular to a line that connects the longitudinal axis of each pin with the swing axis of each tool when the tip of the tool is close to the axis of the rotor, each tool tip forming a blunt debarking edge extending parallel to the longitudinal axis of the rotor and having a length from one-tenth to one-twentieth of the maximum log diameter, and the number of revolutions per minute imparted to the rotor being such that the speed of travel of the tip of a tool on the wood surface of a log being debarked, and which log is of the largest diameter for which the machine is intended, being 15 to 35 feet per second.

10. A debarking machine as claimed in claim 9, in which the rotor has a plurality of symmetrically spaced apertures extending therethrough parallel to the axis of the rotor, bushing means disposed within the apertures and including neck portions protruding from opposite sides of the rotor, antifriction bearing means within the neck portions on the infeed side of the rotor, and a tool-carrying shaft journaled in each of said antifriction bearing means and extending through the bushing means and beyond the neck portion on the outfeed side of the rotor.

11. A debarking machine as claimed in claim 10, in which said means for swinging said tools inwardly further includes annular means secured to the outfeed side of the rotor, and means carried by said annual means for adjusting said means that applies force to each of the pins, and said annular means mounting an external cylindrical member which constitutes said one driven component for imparting rotation to said rotor, and which accommodates a belt drive by which power is transmitted to the rotor.

12. A debarking machine as claimed in claim 4, in which the annular hollow frame includes an annular drive-chain-accommodating space intermediate the sides thereof, said frame having an opening communicating with this space, and the drive elements for imparting rotation to the rolls including symmetrically spaced sprockets disposed within the annular space.

13. A debarking machine as claimed in claim 12, in which a bearing journals the rotor within the stator, and in which said annular space includes a lower portion constituting an oil sump, means sealing the inner and outer peripheries of said space relative to the exterior of the frame and the stator, and means for providing a continous flow of oil from the sump to the bearing including a drive chain constituting one element of said other driven components and, when operating within the annular space, lifting oil from the sump and carrying it to the top of the stator, first and second passage means through the stator at the top and bottom thereof, respectively, and communicating with the bearing, third passage means through the inner periphery of the space at the top of the frame and communicating with said first passage means, whereby oil that has been carried to the top of the stator flows from the chain and through the third and first passage means to the bearing, and additional passage means for returning oil, that flows down through the second passage means at the bottom of the stator, to the sump.

14. A debarking machine as claimed in claim 13, in which said additional passage means further includes a sight-glass arrangement on the outfeed face of the annular frame at the bottom thereof, whereby both oil level and oil flow can be checked.

15. A debarking machine as claimed in claim 4, in which the respective infeed and outfeed mechanisms each constitute a compact assembly for supporting the feed rolls, transmitting power to the same for feeding logs, and accommodating automatic opening of the feed rolls when the end of a log is fed thereagainst, said assembly comprising a hub for each feed roll, bearing means supported within the annular hollow frame for swingably journaling the hub, a hollow arm, a roll-supporting shaft housed within the arm, gear means for driving said shaft, means sealing the interior of the arm to provide a sealed oil bath for the shaft and gear means, means connected between the respective hubs on the same side of the frame for transmitting and receiving arm-swinging impulses from any one feed roll to the other feed rolls on that same side of the frame, there being a set of three feed rolls on each side of the frame, the axes about which the three hubs on each side of the frame can swing defining apices of an equilateral triangle, the axis of each roll-supporting shaft extending perpendicular to the axis of its hub, and means applying torque to one of the hubs on each side of the frame to continuously urge all of the arms to swing in closing directions whereby the feed rolls are urged toward the center line of log travel.

16. A debarking machine as claimed in claim 15, in which said last-mentioned means includes at least one tube-shaped elastomer spring for continuously and elastically actuating each set of feed rolls, and in which the means connected between the respective hubs on each side of the frame constitute synchronizing links disposed exteriorly of the annular frame.

17. A debarking machine as claimed in claim 16, in which the tube-shaped elastomer spring means includes means for hydraulically damping rapid motions thereof, and resilient means for stopping arm-closing spring movement at a selected point to thereby cause the three arms in each set to stop at a selected distance from one another to thereby stop the inward movement of the rolls at a distance selected with respect to the minimum log diameter.

References Cited in the file of this patent

UNITED STATES PATENTS

| | | |
|---|---|---|
| 2,625,968 | Eklund et al. | Jan. 20, 1953 |
| 2,646,092 | Kolpe et al. | July 21, 1953 |

FOREIGN PATENTS

| | | |
|---|---|---|
| 31,052 | Sweden | June 23, 1911 |
| 1,070,548 | France | Feb. 24, 1954 |